United States Patent
Pedersoli

(10) Patent No.: US 10,889,153 B2
(45) Date of Patent: Jan. 12, 2021

(54) TRAILER HITCH COVER ASSEMBLY

(71) Applicant: Maher Pedersoli, Tuscon, AZ (US)

(72) Inventor: Maher Pedersoli, Tuscon, AZ (US)

( * ) Notice: Subject to any disclaimer, the term of this patent is extended or adjusted under 35 U.S.C. 154(b) by 243 days.

(21) Appl. No.: 15/939,241

(22) Filed: Mar. 28, 2018

(65) Prior Publication Data

US 2018/0290509 A1   Oct. 11, 2018

Related U.S. Application Data

(60) Provisional application No. 62/582,512, filed on Nov. 7, 2017, provisional application No. 62/480,521, filed on Apr. 2, 2017.

(51) Int. Cl.
| | |
|---|---|
| *B60D 1/60* | (2006.01) |
| *B60Q 1/26* | (2006.01) |
| *G09F 21/04* | (2006.01) |
| *B60Q 5/00* | (2006.01) |
| *B60R 21/231* | (2011.01) |
| *B60R 21/00* | (2006.01) |
| *B60R 21/34* | (2011.01) |
| *B60Q 1/30* | (2006.01) |
| *B60Q 1/44* | (2006.01) |
| *B60Q 9/00* | (2006.01) |

(52) U.S. Cl.
CPC .......... *B60D 1/605* (2013.01); *B60Q 1/2603* (2013.01); *G09F 21/04* (2013.01); *B60Q 1/30* (2013.01); *B60Q 1/44* (2013.01); *B60Q 1/444* (2013.01); *B60Q 5/005* (2013.01); *B60Q 9/003* (2013.01); *B60R 21/231* (2013.01); *B60R 2021/0011* (2013.01); *B60R 2021/346* (2013.01)

(58) Field of Classification Search
CPC .......... B60D 1/605; B60D 1/065; B60D 1/06; B60D 1/50; B60Q 9/003; B60R 19/02; B60R 19/56
See application file for complete search history.

(56) References Cited

U.S. PATENT DOCUMENTS

| | | | | |
|---|---|---|---|---|
| 6,224,119 B1 * | 5/2001 | Haffmans | ................ | B60D 1/60 280/507 |
| 6,483,059 B1 * | 11/2002 | Scott | ........................ | B60D 1/28 200/331 |
| 7,455,524 B1 * | 11/2008 | Fudala | .................... | H01R 31/06 280/422 |
| 9,834,052 B2 * | 12/2017 | Corless | .................. | B60D 1/605 |
| 10,328,848 B1 * | 6/2019 | Schaufele | ................ | B60Q 1/50 |
| 10,355,401 B1 * | 7/2019 | Billings | .................. | H01R 13/60 |
| 2014/0001781 A1 * | 1/2014 | Leking | .................... | B60R 19/26 293/135 |

* cited by examiner

*Primary Examiner* — Nicole T Verley
(74) *Attorney, Agent, or Firm* — Kang S. Lim

(57) ABSTRACT

A trailer hitch cover assembly, which includes an inflatable object capable of withstanding about 2000 pounds per square inch internal pressure, a first attachment plate disposed within the inflatable object, a second attachment plate disposed in physical contact with but external to the inflatable object, a housing comprising a plurality of threaded apertures extending therethrough and dimensioned to be received by a trailer hitch receiver, where a corresponding plurality of threaded members are attached to the first attachment plate, extend outwardly from the first attachment plate through a surface of the inflatable object, extend through the second attachment plate, and intermesh with the plurality of threaded apertures.

17 Claims, 28 Drawing Sheets

FIG. 5L
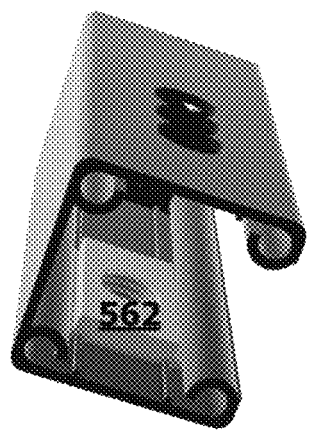
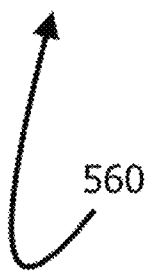

TRAILER HITCH COVER ASSEMBLY

CROSS REFERENCE TO RELATED APPLICATION

This application claims the benefit of U.S. provisional application entitled "Trailer Hitch Cover Assembly," U.S. application Ser. No. 62/582,512, filed in the USPTO on Nov. 7, 2017, by inventor Pedersoli, which is incorporated herein by reference.

This application also claims the benefit of U.S. provisional application entitled "Trailer Hitch Cover Assembly and Mounting System for an Inflatable Three Dimensional Object," U.S. application Ser. No. 62/480,521, filed in the USPTO on Apr. 2, 2017, by inventor Pedersoli, which is incorporated herein by reference.

FIELD

Applicant's disclosure is directed to a trailer hitch cover assembly. More specifically, an assembly configured to be releasably fixtured to a hitch tube attached to a vehicle.

BACKGROUND

Prior art trailer hitch covers typically display one or more graphics. Such graphics often include one or more sports team logos. Often the sports team is a high school team, a college team, or a professional team.

SUMMARY

A trailer hitch cover assembly is disclosed. The trailer hitch cover assembly comprises an inflatable object capable of withstanding about 2000 pounds per square inch internal pressure, a first attachment plate disposed within the inflatable object, a second attachment plate disposed in physical contact with, but external to, the inflatable object, a housing comprising a plurality of threaded apertures extending therethrough, and dimensioned to be received by a trailer hitch receiver, wherein a corresponding plurality of threaded members are attached to the first attachment plate, extend outwardly from the first attachment plate through a surface of the inflatable object, extend through the second attachment plate, and intermesh with the plurality of threaded apertures.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The invention will be better understood from a reading of the following detailed description taken in conjunction with the drawings in which like reference designators are used to designate like elements, and in which:

FIGS. 5L and 5M illustrate a fourth embodiment of Applicant's housing; and

FIGS. 5N and 5O illustrate a fifth embodiment of Applicant's housing.

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention, and it will be appreciated by those skilled in the art that it is intended to cover alternatives, modifications, and equivalents as may be included within the spirit and scope of the invention as defined by the appended claims and their equivalents as supported by the following disclosure and drawings.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "consist", "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

Figure 1A:
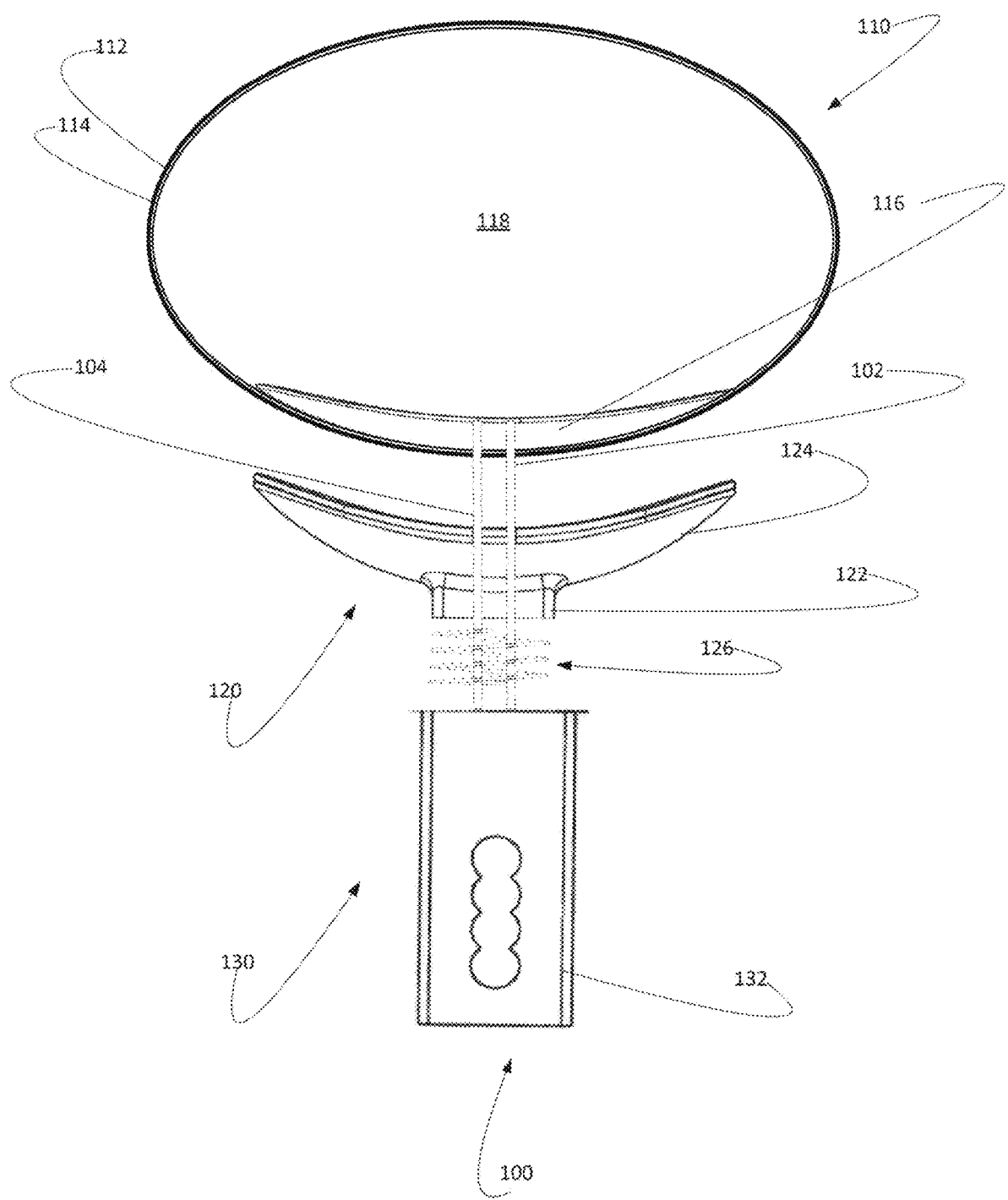
FIG. 1A illustrates the components comprising a first embodiment of Applicant's trailer hitch cover assembly.

FIG. 1A illustrates Applicant's assembly. Referring now to FIG. 1A, Applicant's trailer hitch cover assembly 100 comprises an inflatable object 110. Inflatable object 110 comprises an internal bladder 114 in combination with a first attachment plate 116. In the illustrated embodiment of FIG. 1A, first attachment plate 116 is disposed on top of bladder 114. In other embodiments, first attachment plate 116 is disposed between outer surface 112 and internal bladder 114. In still other embodiments, first attachment plate is integral with bladder 114.

In the illustrated embodiment of FIG. 1A, optional spring 126 is shown disposed between bottom aspect 122 of second attachment plate 124 and a top portion of housing 130. In other embodiments, Applicant's assembly 100 comprises two springs 126, wherein a first spring 126 is disposed around threaded screw 102 and a second spring 126 is disposed around threaded screw 104. Applicant has found that using one or more optional springs 126 effectively dampens vibrations and rattles that result from aspect 122 of second attachment plate 124 striking a top aspect of housing 130 while a vehicle equipped with Applicant's assembly 100 is in motion.

Figure 2A:
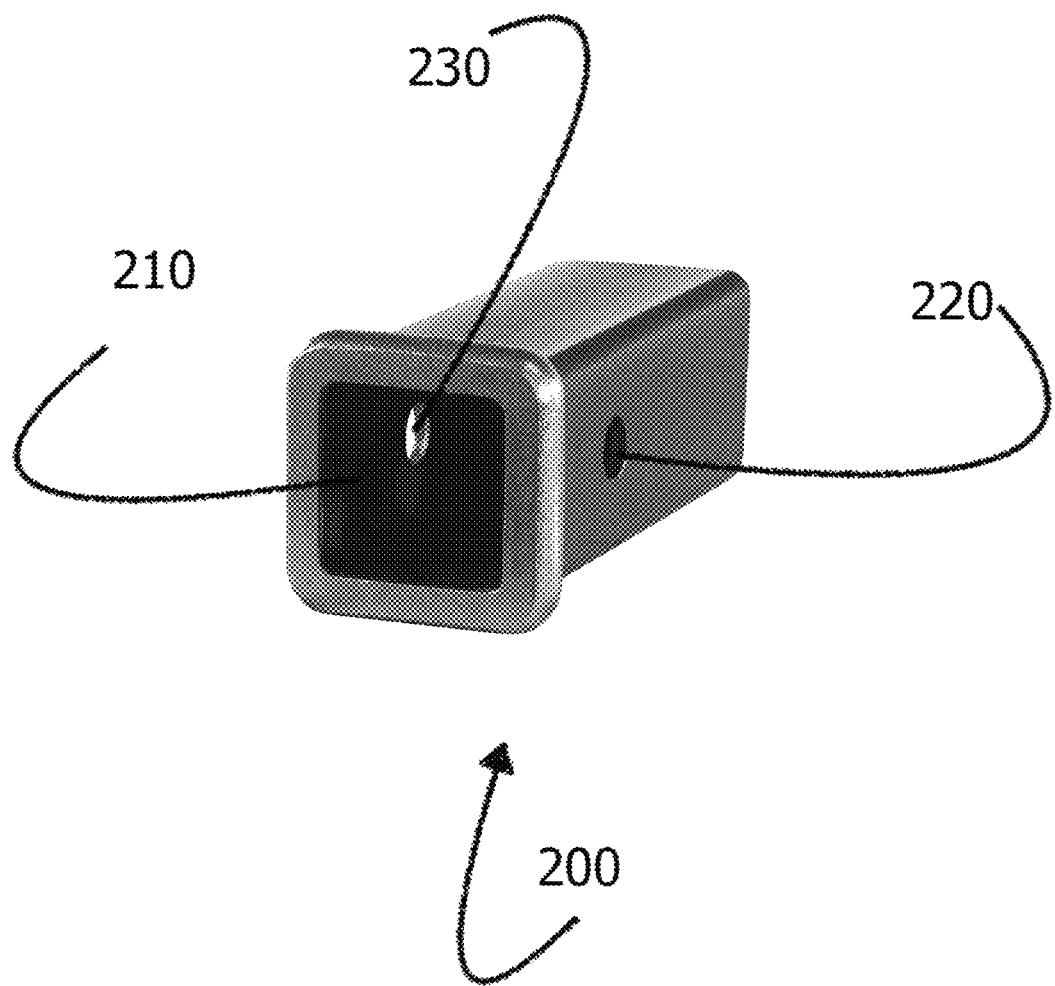
FIG. 2A illustrates a prior art trailer hitch receiver assembly.

FIG. 2A illustrates a hitch tube 200, wherein hitch tube 200 can be permanently attached to the frame of a vehicle. Hitch tube 200 comprises a square aperture 210 extending inwardly. Distal end 132 (FIG. 1A) of assembly 100 (FIG. 1A) can be removably inserted into aperture 210 formed in hitch tube 200.

Figure 2B:
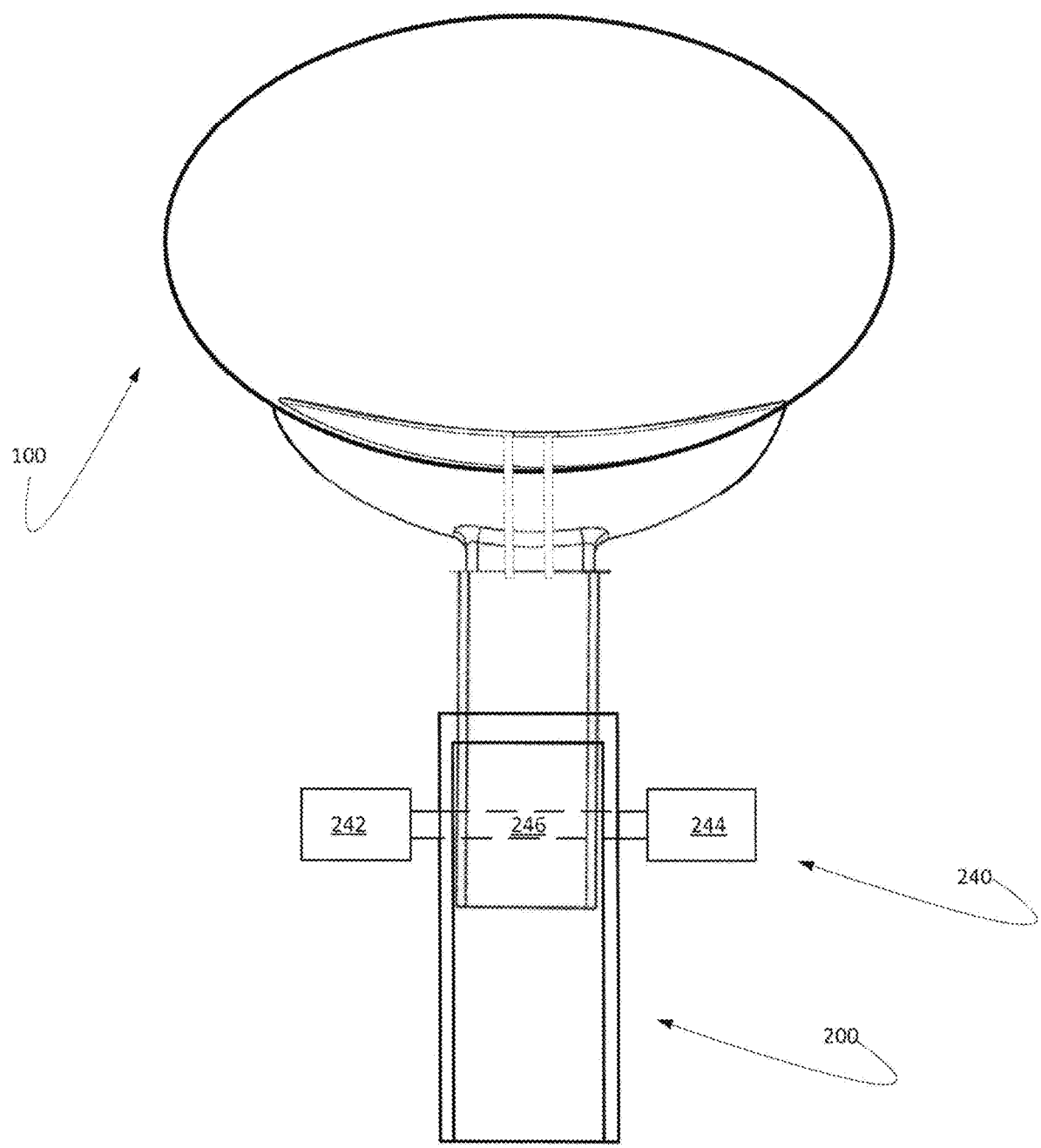
FIG. 2B illustrates Applicant's assembly 100 lockingly attached to the trailer hitch receiver of FIG. 2A.

Referring now to FIG. 2B, fixturing assembly 240 comprises a first external locking portion 244, second external locking portion 242, and locking member 246 lockingly attached to second external locking portion 242. Locking member 246 is shown removably inserted into and through aperture 220 (FIG. 2A), into and through apertures 518 (FIG. 5B) formed a first side of housing 130, into and through apertures 520 (FIG. 5C), and into and through aperture 230 (FIG. 2A).

In the illustrated embodiment of FIG. 1A, inflatable object 110 comprises the shape of a football. FIG. 1A should not be taken as limiting. Rather, football-shaped inflatable object 110 comprises one embodiment. In other embodiments, inflatable object 110 is selected from the group consisting of a football, a sphere, a parallelepiped, a cube, and an irregular shape.

In certain embodiments, inflatable object 110 is not an item of commerce. Rather, in certain embodiments, inflatable object 110 comprises an inflatable internal bladder 114. In certain embodiments, Applicant's inflatable internal bladder 114 comprises a thickness of about 10 mm. In certain embodiments, Applicant's inflatable internal bladder 114 can be safely pressurized to greater than 2000 pounds per square inch ("PSI").

In certain embodiments, Applicant's inflatable bladder is formed from a copolymer of acrylonitrile and butadiene. In certain embodiments, Applicant's inflatable bladder is formed from one or more fluorocarbon elastomers. In certain embodiments, Applicant's inflatable bladder is formed from one or more silicone elastomers. In certain embodiments, Applicant's inflatable bladder is formed from NEOPRENE. In certain embodiments, Applicant's inflatable bladder is formed from one or more polyacrylates.

Figure 1B:
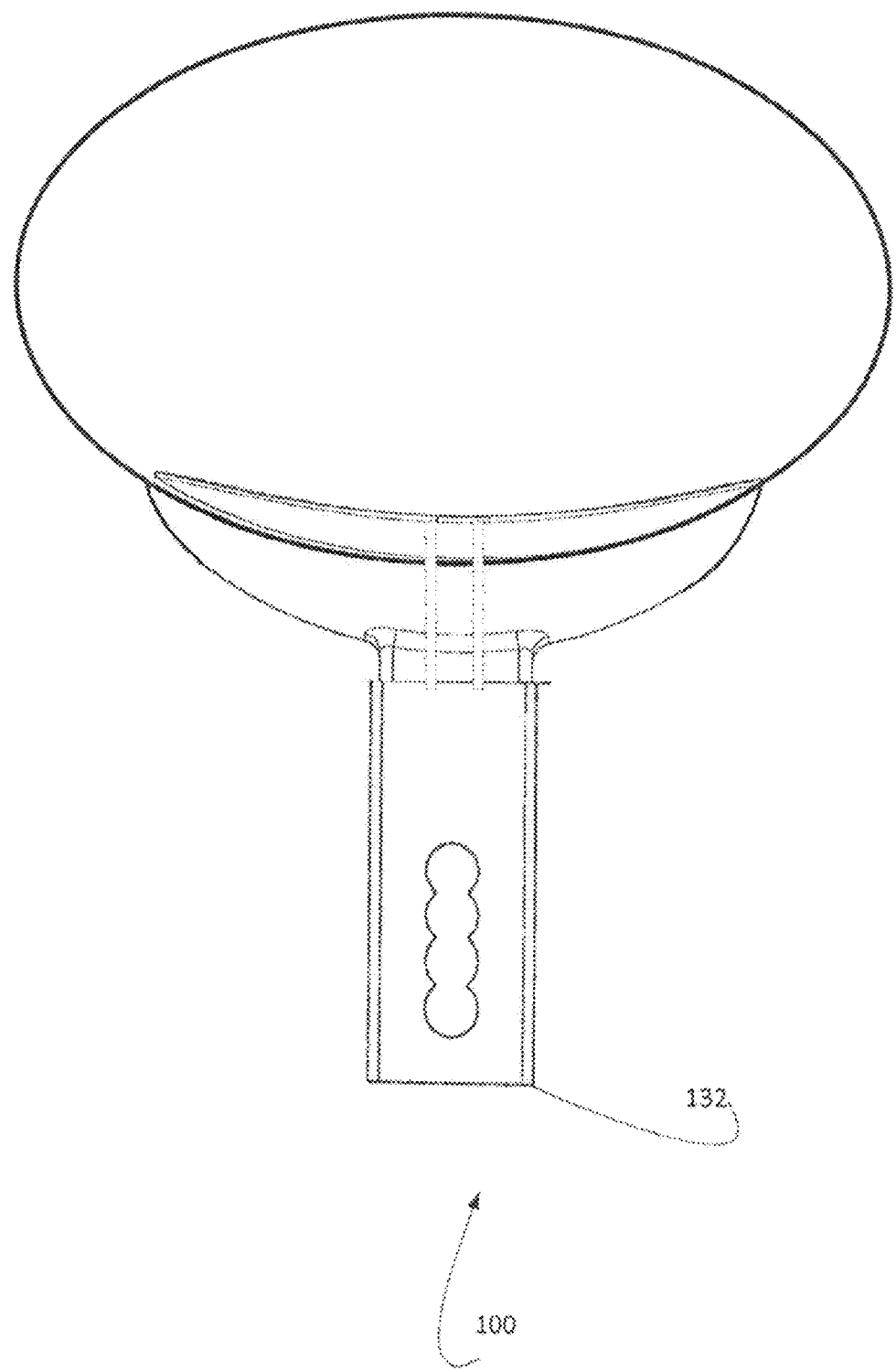
FIG. 1B illustrates the assembly of FIG. 1A.

Referring again to FIG. 1A, in certain embodiments first mounting plate 116 is disposed within inflatable object 110. First mounting plate 116 can be attached to second mounting plate 124, wherein second mounting plate 124 is external to inflatable object 110. In the illustrated embodiments of FIG. 1A, a first end of threaded screws 102 and 104 extend outwardly from first mounting plate extend through surface 112 of inflatable object 110, extend through second mounting plate 124, and extend through threaded apertures formed in a top portion of housing 130 to securely fixture inflatable object 114 to second mounting plate 124 and to housing 130 as shown in FIG. 1B.

Figure 1C:
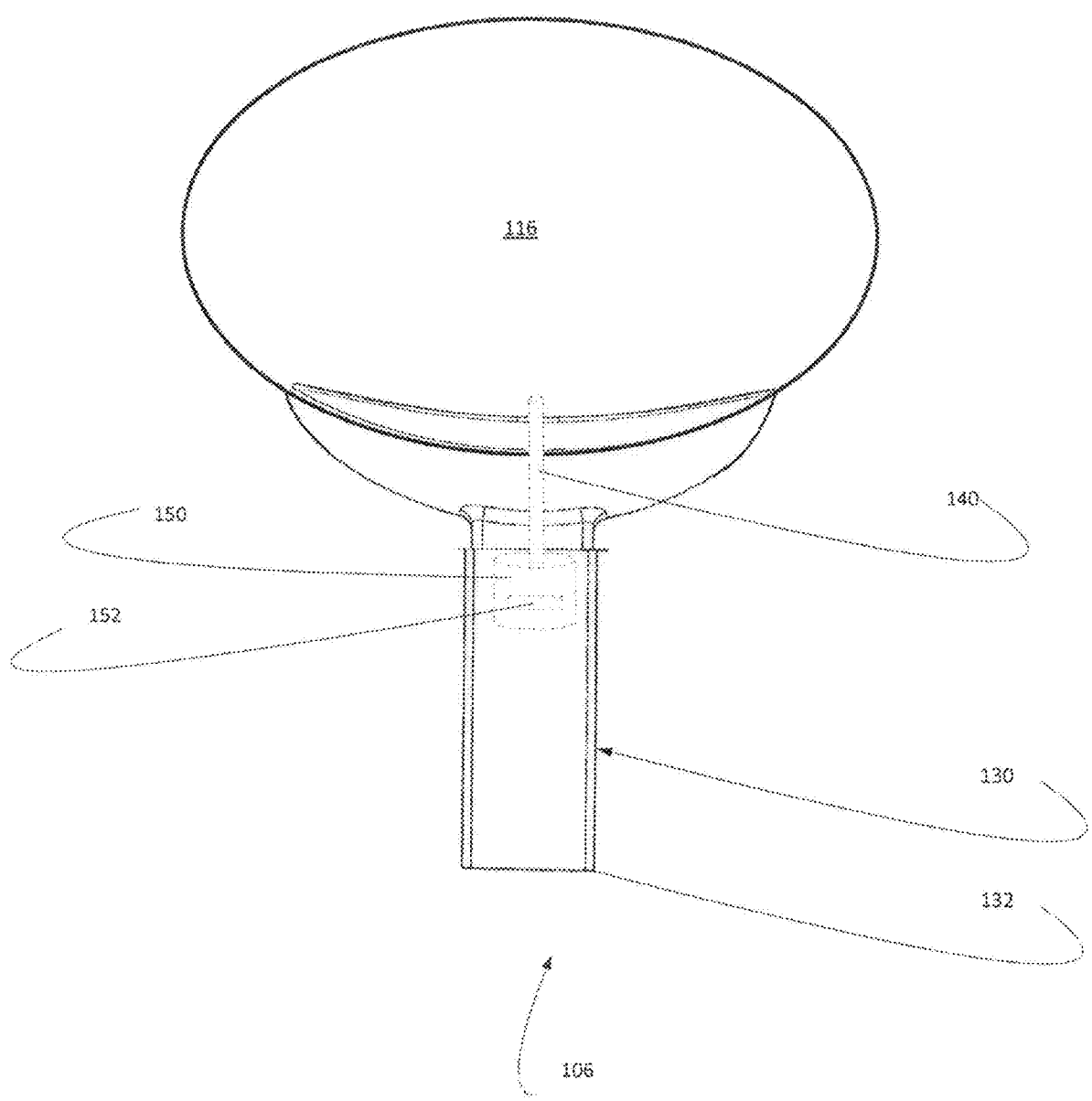
FIG. 1C illustrates a second embodiment of Applicant's trailer hitch cover assembly.

FIG. 1C illustrates Applicant's trailer hitch cover assembly 106 which comprises the elements of Applicant's trailer hitch cover assembly 100 (FIGS. 1A, 1B) in combination with a tubular member 140 comprising an internal rupture disk and an audible alert device 150 comprising an air exit 152. When Applicant's assembly is fixtured to hitch tube 200, which has been permanently attached to a rear portion of a vehicle's frame, inflatable object 110 extends outwardly from the rear aspect of the vehicle. If that rear aspect of the vehicle strikes an object, air contained within space 116 is rapidly expelled through tubular member 140, through audible alert device 150, and out aperture 152, thereby causing audible alert device 150 to emit an audible sound. In certain embodiments, audible alert device 150 comprises a whistle. In certain embodiments, audible alert device 150 comprises a vehicular horn.

Figure 1D:
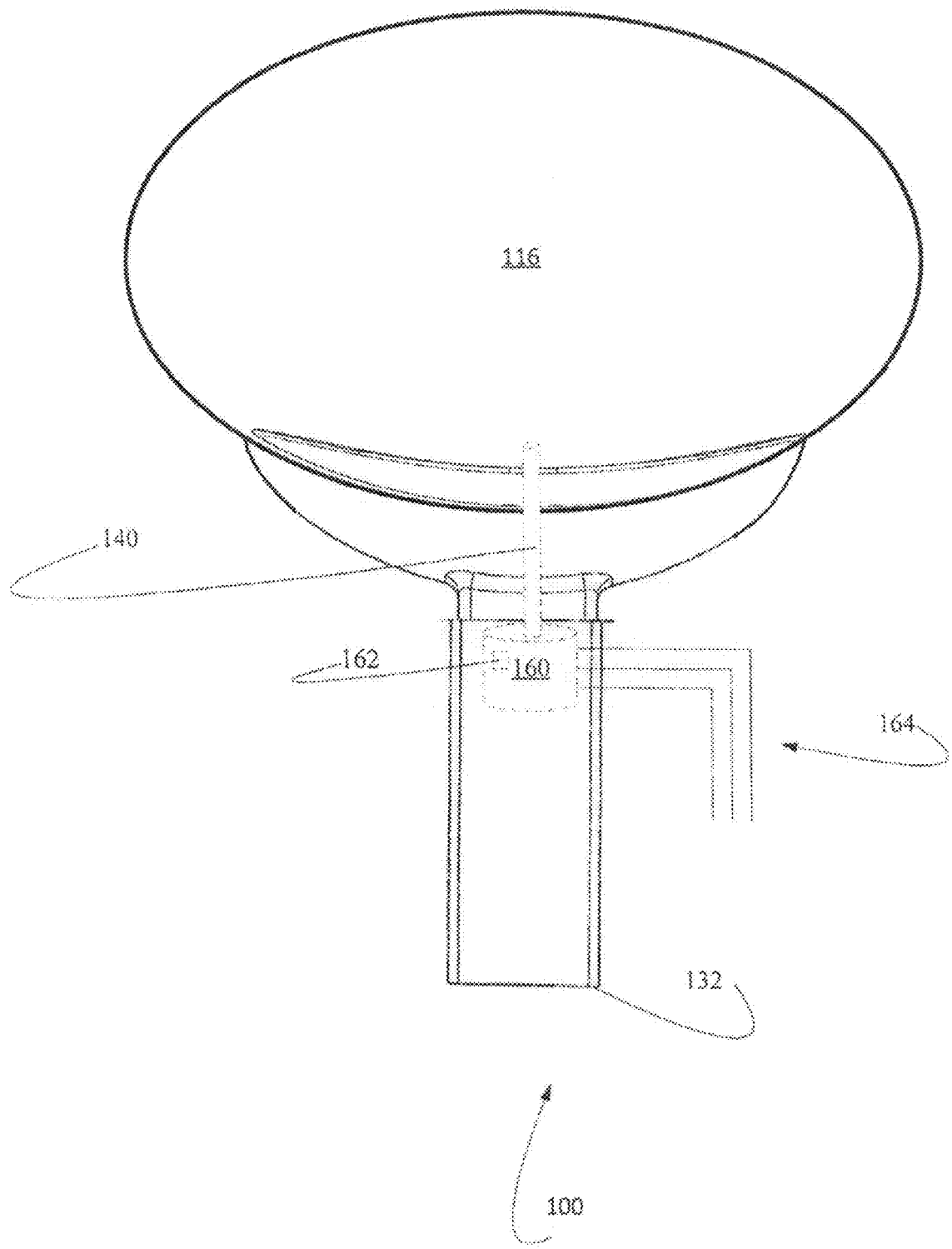
FIG. 1D illustrates a third embodiment of Applicant's trailer hitch cover assembly.

FIG. 1D illustrates Applicant's trailer hitch cover assembly 108 which comprises the elements of Applicant's trailer hitch cover assembly 100 (FIGS. 1A, 1B) in combination with a tubular member 140 and electric air pump 160 comprising an pressure sensor 162, wherein electric air pump 160 interconnects to the vehicle's electrical system via wiring harness 164.

In certain embodiments, pressure sensor 162 continuously monitors the pressure within interior space 116. When the pressure within space 116 drops below a threshold pressure level, then air pump 160 is energized and pumps air through tubular member 140 and into interior space 116 until the pressure within space 116 exceeds the threshold pressure level.

In certain embodiments, the threshold pressure is pre-set during manufacturing. In other embodiments, the threshold pressure can be set using a signal line disposed within wiring harness 164.

In certain embodiments Applicant's apparatus 100 (FIGS. 1A, 1B) does not comprise first attachment plate 116 (FIG. 1A). Rather and referring now to FIGS. 3A and 3B, in certain embodiments, top portions of screws 102 and 104 are disposed between outer surface 112 and bladder 114, where the distal, threaded portions of screws 102 and 104 extend through apertures formed in outer surface 112 to connect with second attachment plate 124.

Figure 3A:
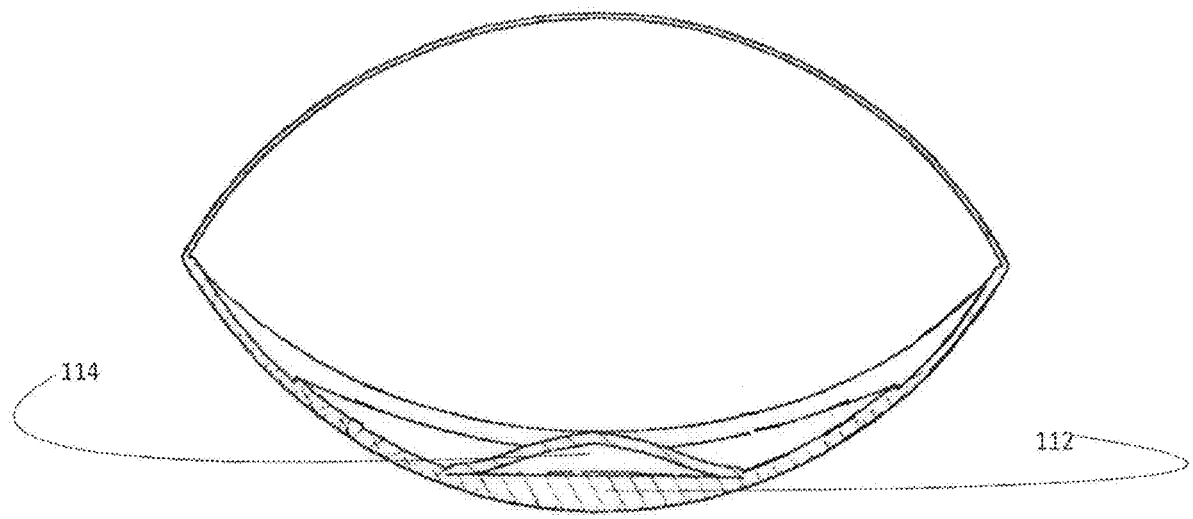
FIGS. 3A and 3B illustrate a second embodiment of Applicant's inflatable object.
Figure 3B:
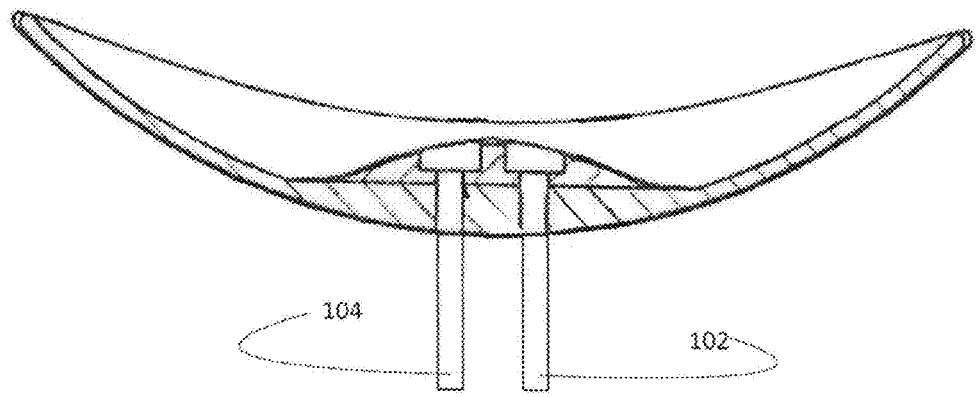
Figure 3C:
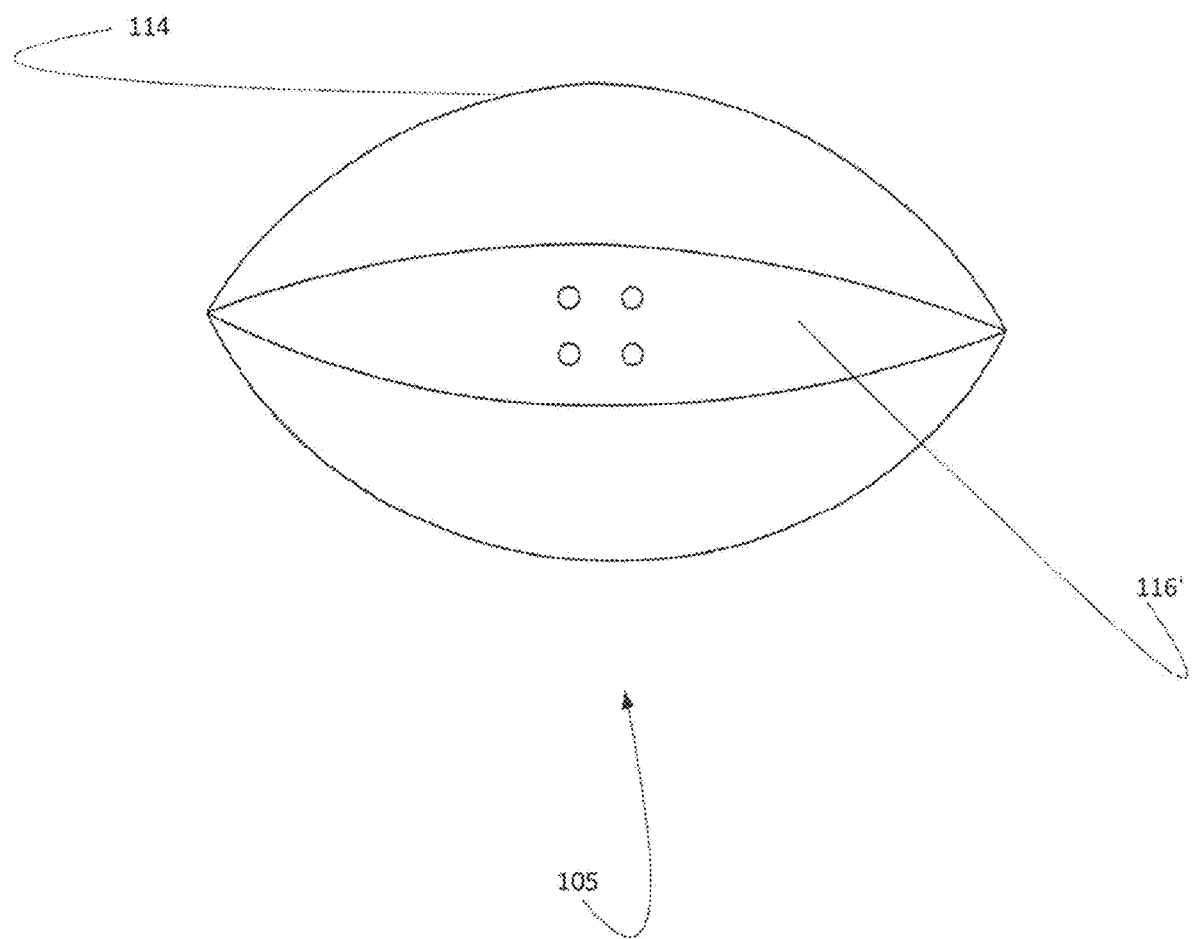
FIG. 3C illustrates a third embodiment of Applicant's inflatable object.

In still other embodiments, outer surface 112 is formed to include an integral first attachment plate. In the illustrated embodiment of FIG. 3C, a bottom aspect of bladder 114 is formed to include an integral first attachment plate 116'. Referring now to FIGS. 3A, 3B, and 3C, in certain embodiments top portions of screws 102 and 104 are disposed between outer surface 112 and bladder 114, where the distal, threaded portions of screws 102 and 104 extend through apertures formed in integral first attachment plate 116' to connect with second attachment plate 124.

Figure 1E:
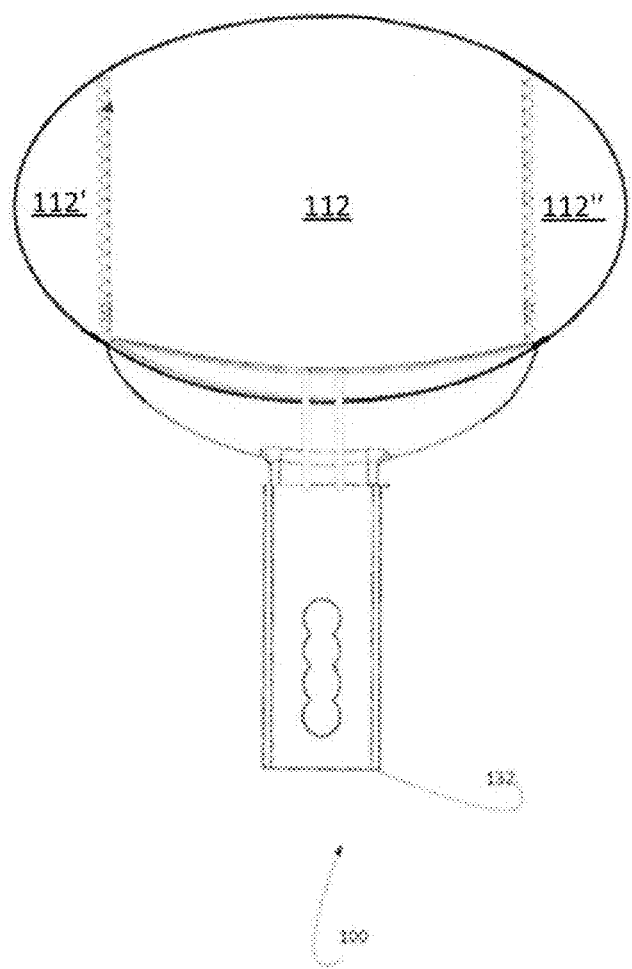
FIG. 1E illustrates a fourth embodiment of Applicant's trailer hitch cover assembly.

In certain embodiments, outer surface 112 is formed to include a first discrete portion formed from a first polymeric material, in combination with one or more second discrete portions formed from a second polymeric material. For example in the illustrated embodiment of FIG. 1E, outer surface portion 112 is formed from a first polymeric material comprising a first tensile strength and a first tensile modulus. Outer surface portion 112' is formed from a second polymeric material comprising a second tensile strength and a second tensile modulus. Outer surface portion 112" is formed from a third polymeric material comprising a third tensile strength and a third tensile modulus.

In certain embodiments, the first tensile strength/first tensile modulus are greater than either the second tensile strength/second tensile modulus or the third tensile strength/ third tensile modulus. If the rear end of a vehicle equipped with Applicant's assembly of FIG. 1E strikes a fixed object, then the internal pressure in inflatable object 110 increases. Applicant's assembly 100 of FIG. 1E responds to such an internal pressure increase by expanding portions 112' and 112" to prevent failure of an over-pressurized bladder 114.

Figure 1F:
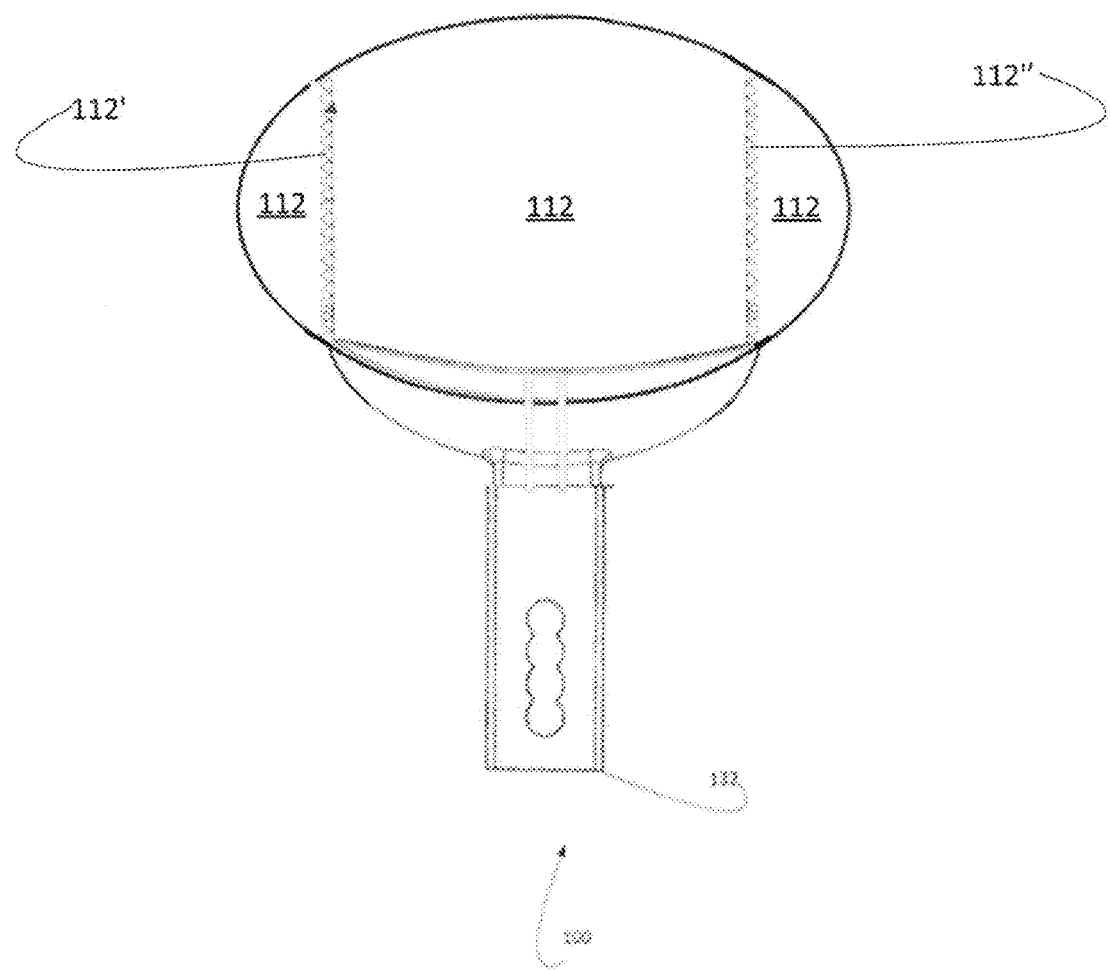
FIG. 1F illustrates a fifth embodiment of Applicant's trailer hitch cover assembly.

In the illustrated embodiment of FIG. 1F, Applicant's outer surface comprises three (3) portions formed from the above-described first polymeric material. A central portion 112 is separated from a first end portions 112 by outer surface portion 112'. That same central outer surface portion 112 is separated from a second end portion 112 by outer surface portion 112".

If the rear end of a vehicle equipped with Applicant's assembly 100 of FIG. 1F strikes a fixed object, then the internal pressure in inflatable object 110 increases. Applicant's assembly 100 of FIG. 1F responds to such an internal pressure increase by expanding portions 112' and 112" to prevent failure of an over-pressurized bladder 114.

Figure 4A:
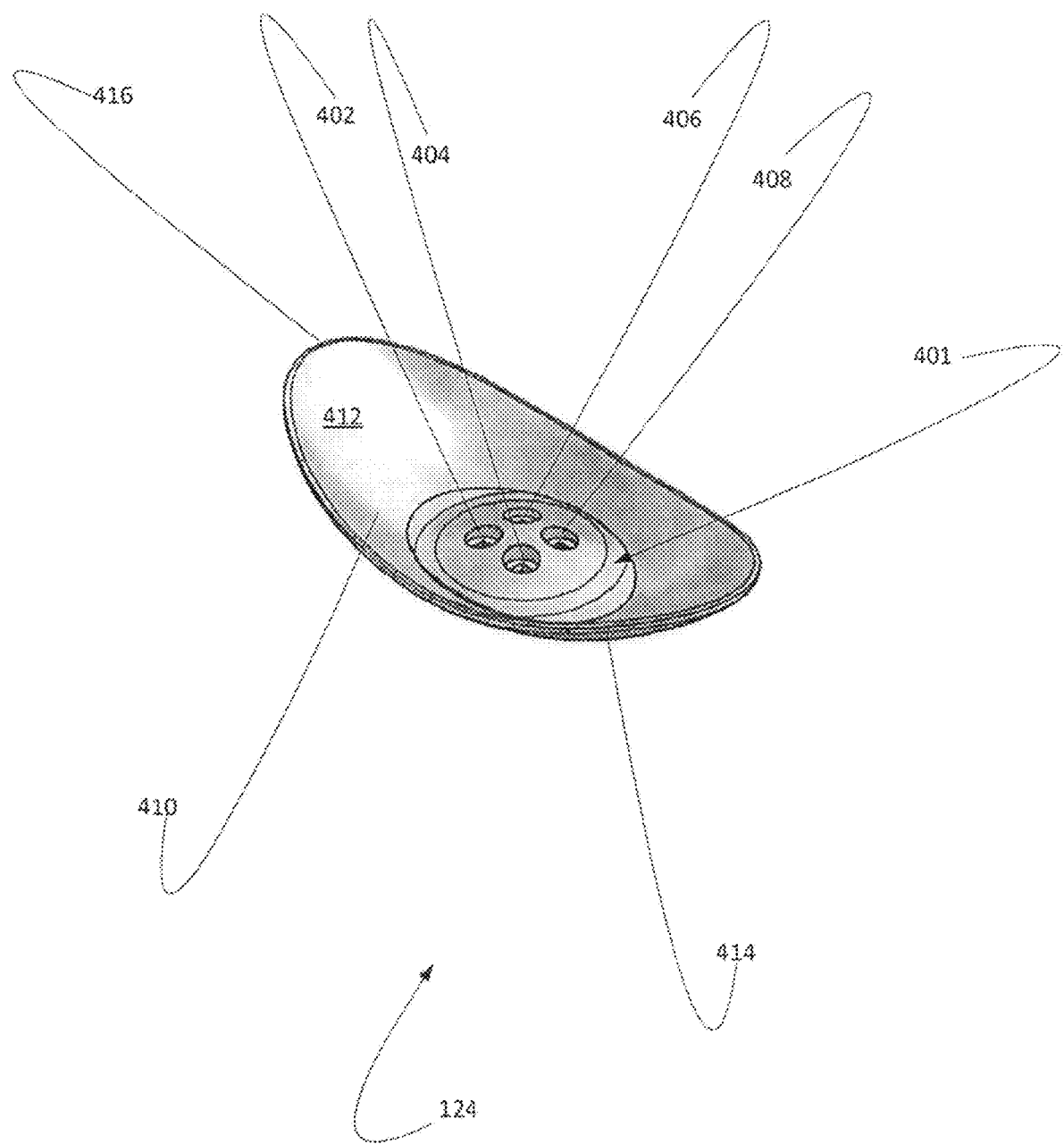
FIG. 4A illustrates a first embodiment of Applicant's second attachment plate.
Figure 4B:
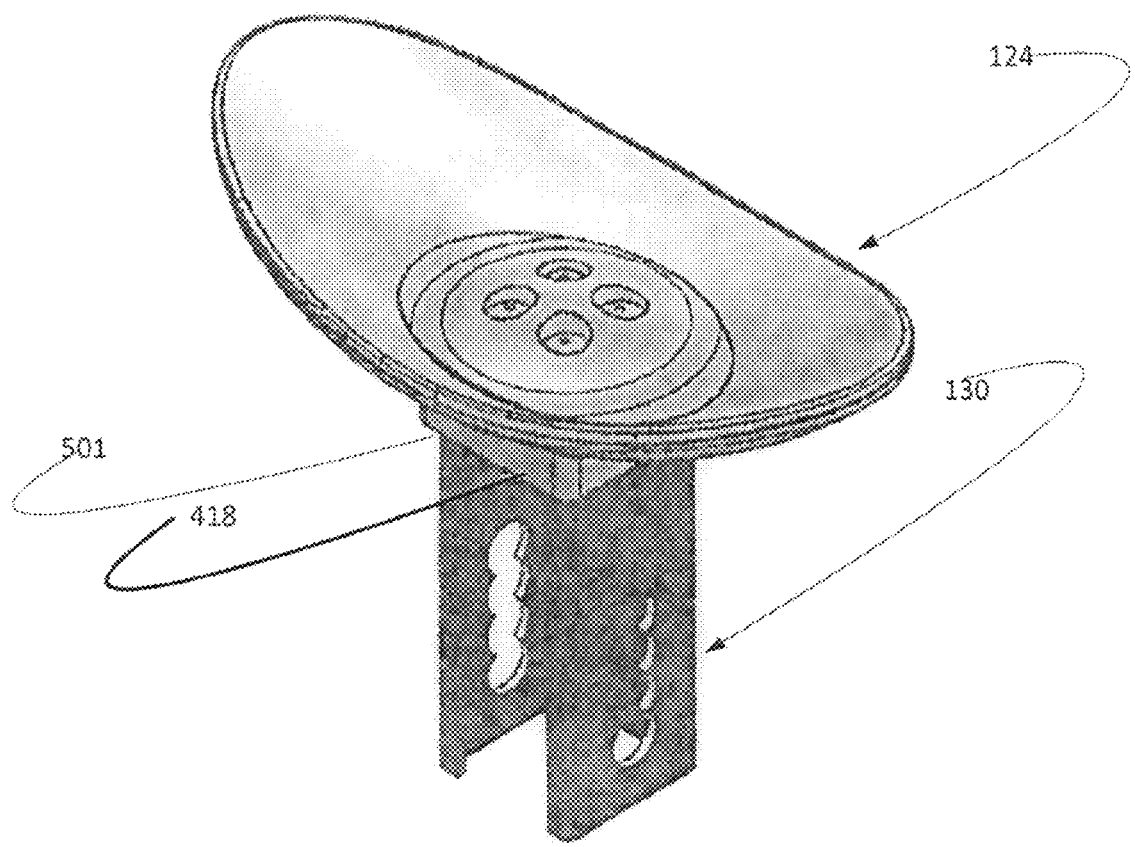
FIG. 4B illustrates the second attachment plate of FIG. 4A attached to housing 130.

FIGS. 4A and 4B illustrate one embodiment of second attachment plate 124. In certain embodiments, second attachment plate comprises a middle portion 401 formed to include a plurality of apertures extending therethrough. In the illustrated embodiment of FIGS. 4A and 4B four (4) apertures 402, 404, 406, and 408, are formed in second attachment plate 124. In certain embodiments, apertures 402, 404, 406, and 408, are threaded apertures. In other embodiments, apertures 402, 404, 406, and 408, are not threaded apertures.

In other embodiments, second attachment plate is formed to include fewer than four apertures extending therethrough. In other embodiments, second attachment plate is formed to include more than four apertures extending therethrough.

Figure 5A:
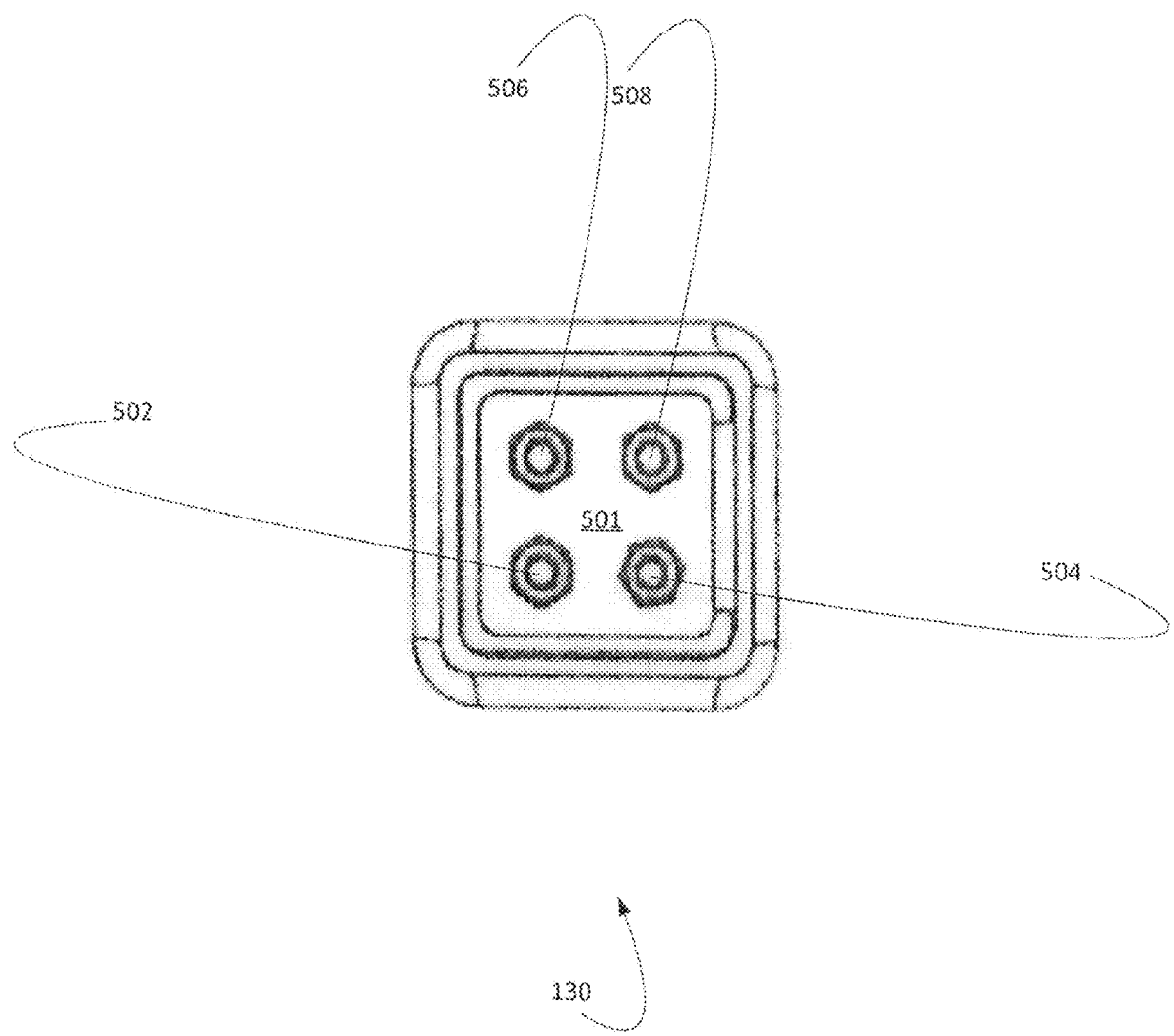
FIG. 5A illustrates a top portion of housing 130.
Figure 5B:
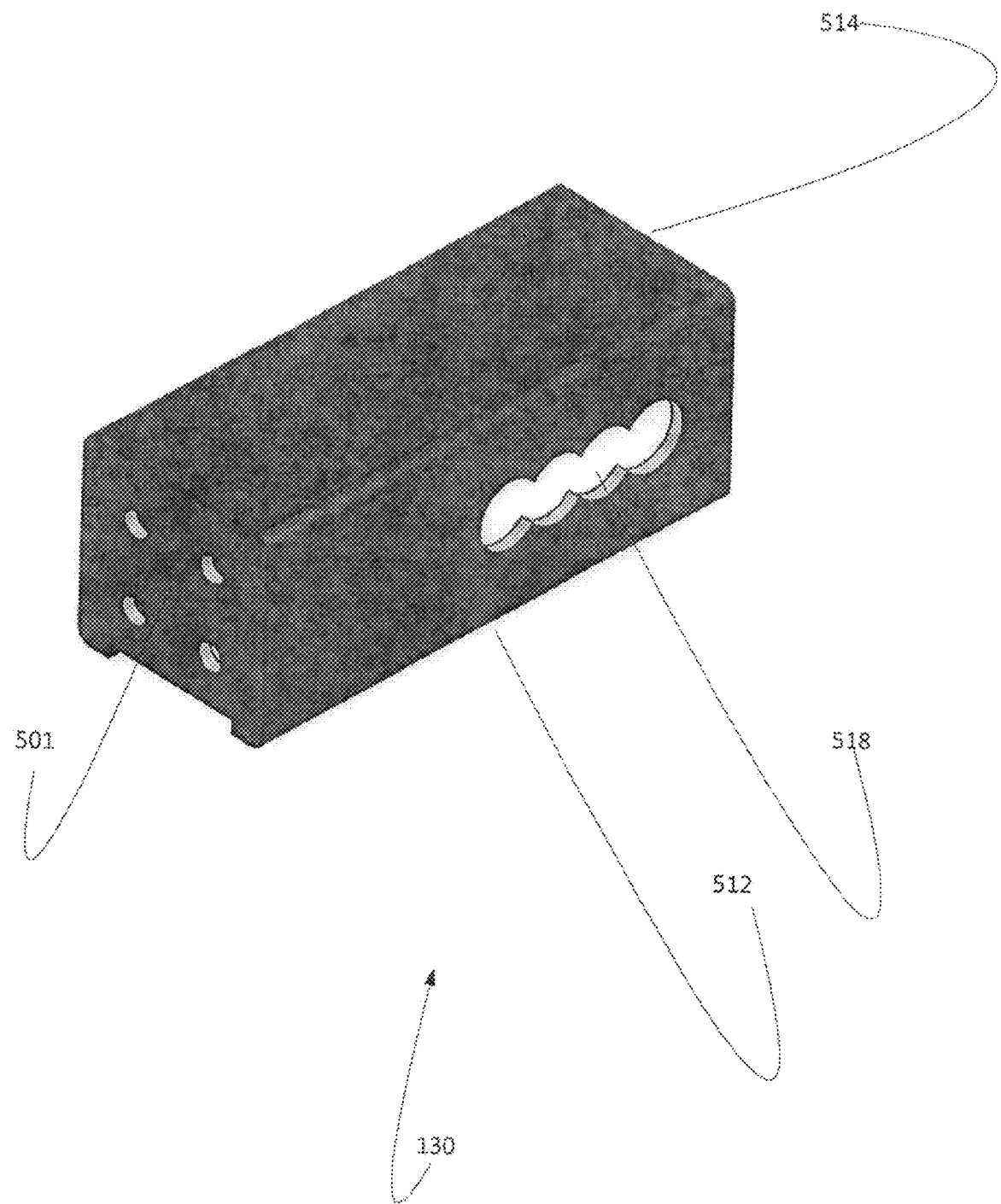
FIG. 5B is a side view of the housing of FIG. 5A.

Referring now to FIGS. 4A and 5B, apertures 402, 404, 406, and 408, extend through square mounting plate 418 to attach to four (4) threaded apertures formed in end 501 of housing 130.

Figure 4C:
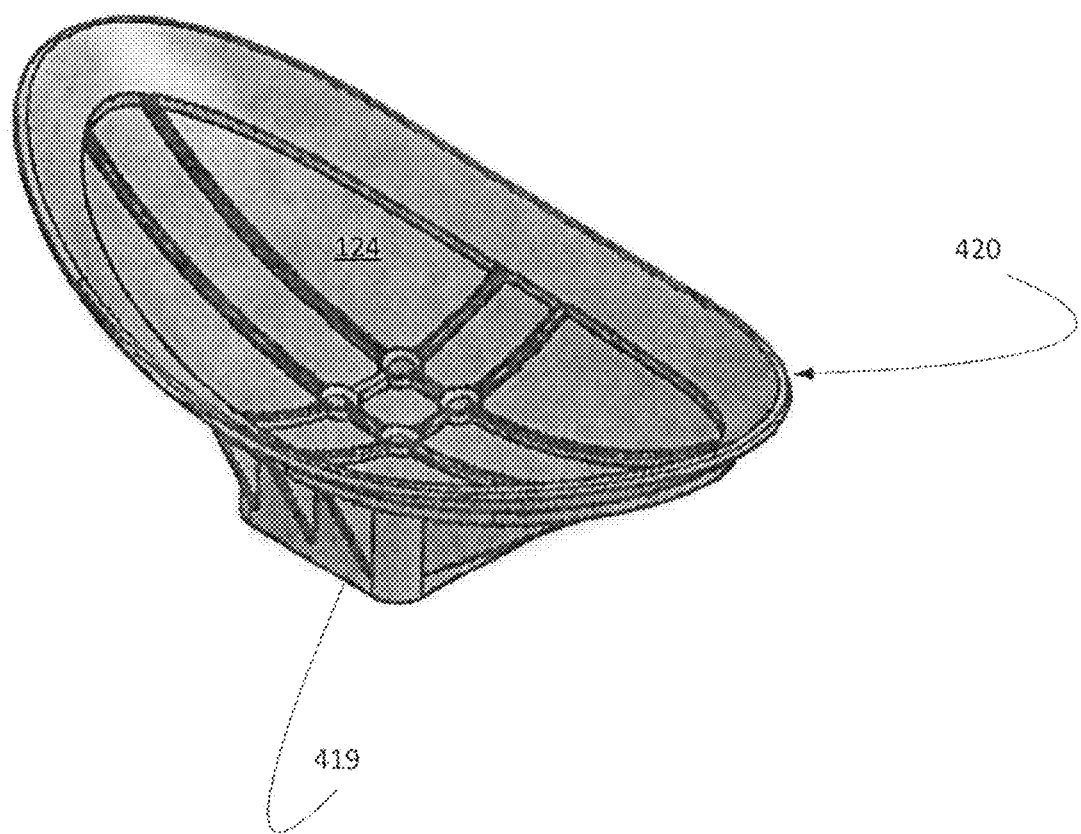
FIG. 4C illustrates a second embodiment of Applicant's second attachment plate.
Figure 4D:
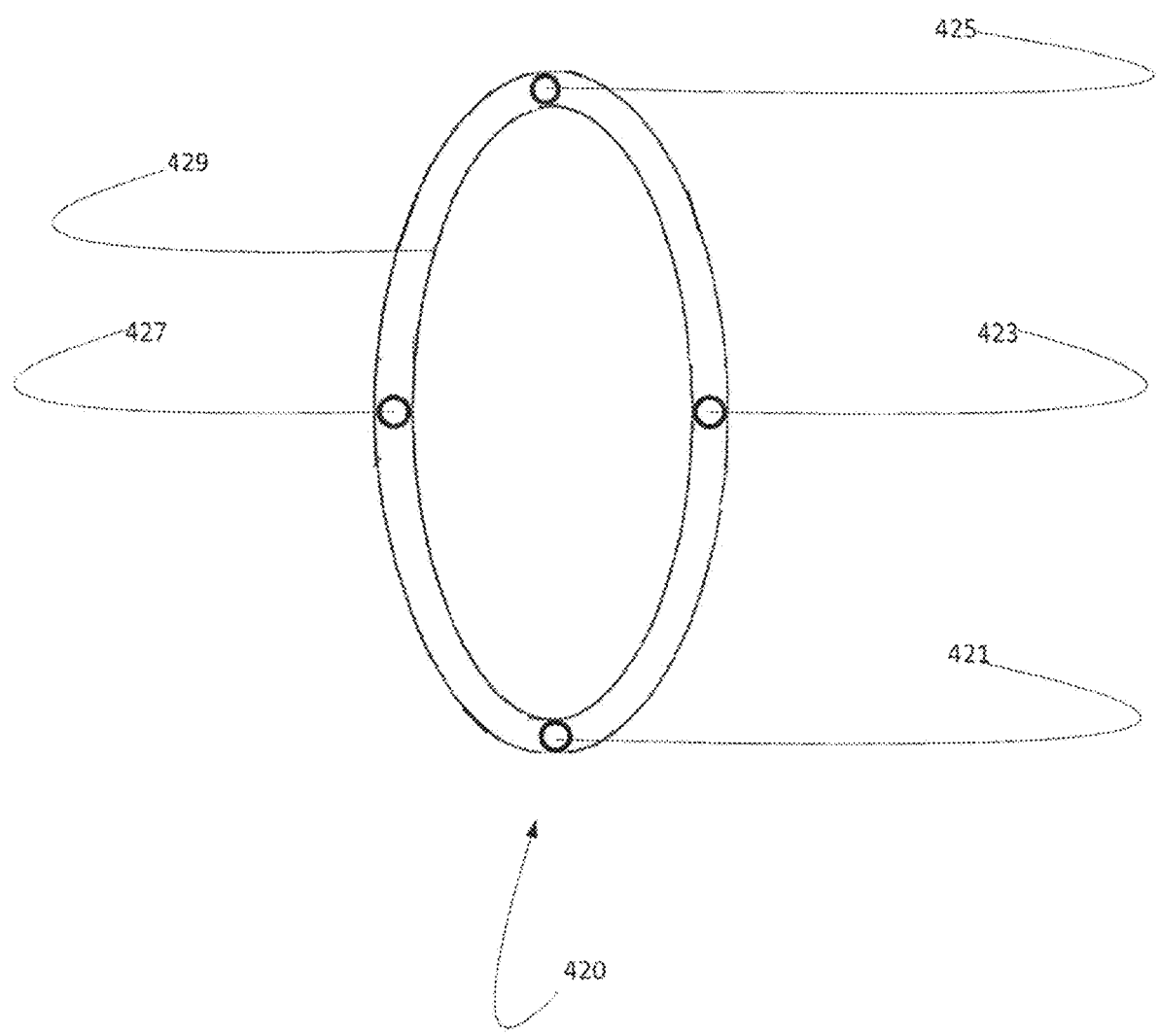
FIG. 4D is a top view of the second attachment plate of FIG. 4C.

FIGS. 4C and 4D illustrate second mounting plate 124 in combination with assembly 420 which is attached to a periphery 416 (FIG. 4A) of second attachment plate 124. In the illustrated embodiment of FIG. 4C, mounting plate 419 is dimensioned to support second attachment plate 124 and assembly 420. Assembly 420 is formed such that inner edge 429 is dimensioned to seamlessly contact periphery 416.

FIG. 4D is a top view of assembly 420 showing assembly 420 comprising four (4) visible-light emitting devices 421, 423, 425, and 427. In other embodiments, assembly 420 comprises more than four visible-light emitting devices. In other embodiments, assembly 420 comprises fewer than four visible-light emitting devices. As a general matter, assembly 420 comprises one or more visible-light emitting devices.

In certain embodiments, the one or more visible light emitting devices comprise LEDs. In certain embodiments, those LED devices are electrically connect to a vehicle's electrical system via a wiring harness, such as wiring harness 164 (FIG. 1D). In certain embodiments, Applicant's wiring harness assembly includes a brake light power line. In certain embodiments, Applicant's assembly monitors a voltage level in such a brake light power line. When that voltage increases as a result of application of a brake pedal, Applicant's assembly causes the one or more visible-light emitting devices to emit visible light.

In certain embodiments, the one or more visible-light emitting devices flash to alert other drivers. In certain embodiments, those one or more visible-light emitting devices flash one or more when a vehicle equipped with Applicant's assembly slows down. In certain embodiments, those one or more visible-light emitting devices flash continuously when there is a rapid de-acceleration. In certain embodiments, those one or more visible-light emitting devices flash one or more times when the equipped vehicle is backing up.

In certain embodiments, electric air pump 160 (FIG. 1D) comprising an pressure sensor 162 continuously monitors the internal pressure in bladder 114. In the event that a vehicle equipped with apparatus 100 including assembly 420 and pressure sensor 162, is operated such that the rear end strikes a fixed object, then pressure sensor detects an immediate over-pressurization of bladder 114, and responds by activating the one or more visible-light emitting devices disposed in assembly 420. In addition, such over-pressurization causes whistle/horn 150 (FIG. 1C) to emit an audible alarm.

Referring once again to FIGS. 5A and 5B, housing 130 comprises an essentially square cross-section defined by three (3) walls, and further comprises a closed first end 501, and an open opposing second end. Closed first end 501 is formed to include one or more apertures extending therethrough. In the illustrated embodiment of FIGS. 5A and 5B, first end 501 is formed to include four (4) apertures 502, 504, 506, and 508, extending through the closed end of housing 130.

Figure 5C:
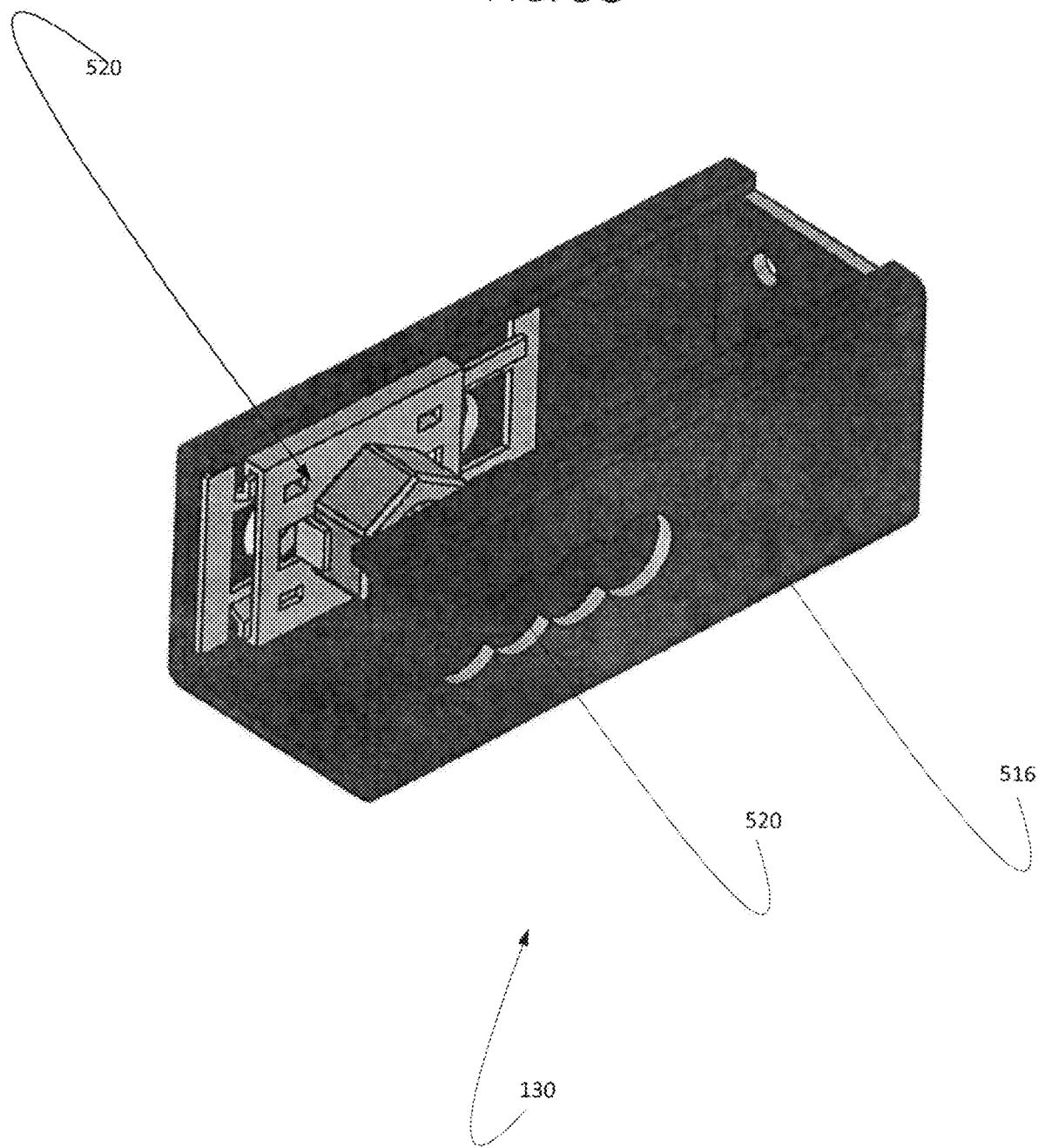
FIG. 5C illustrates the housing of FIGS. 5A and 5B in combination with a fixturing assembly 520.

In the illustrated embodiment of FIGS. 5B and 5C, housing 130 is formed to include an interconnected set of apertures 518 formed in side 512, and a corresponding set of interconnected apertures formed in side 516. The illustrated embodiment of FIG. 5C further comprises assembly 520 disposed on an interior surface of side 512.

Figure 5D:
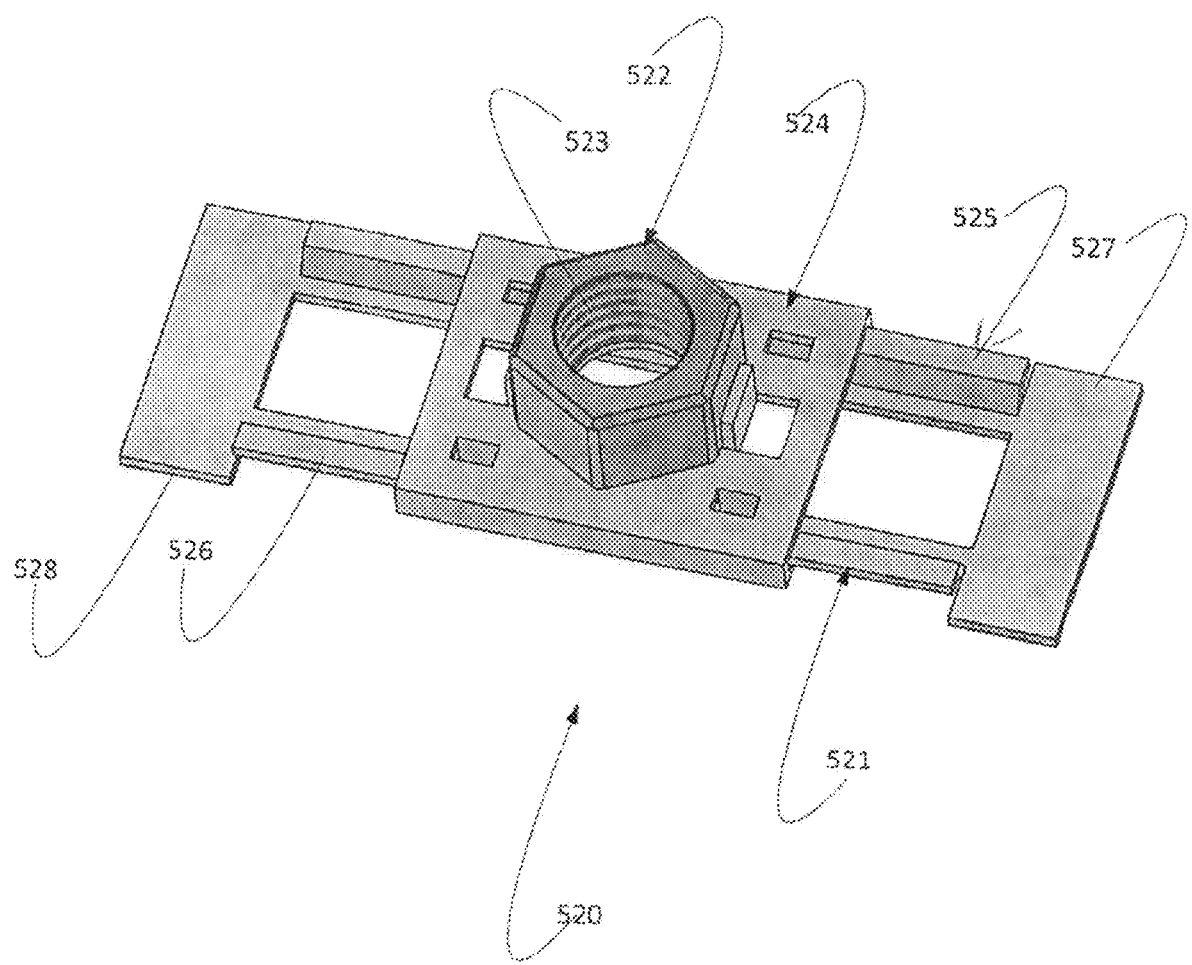
FIG. 5D illustrates moveable assembly 520.

Referring now to FIG. 5D, assembly 520 comprises a first planar member 527 and a second planar member 528. A first rail assembly 521 interconnects first planar member 527 and second planar member 528. A second rail assembly 525 interconnects first planar member 527 and second planar member 528. In certain embodiments, first rail assembly 512 is substantially parallel to second rail assembly 525.

An assembly 524 is slidingly disposed on first rail assembly 521 and second rail assembly 525. Assembly 524 comprises a hexagonal-shaped member 522 formed to include a threaded aperture 523 extending there through.

Figure 5E:
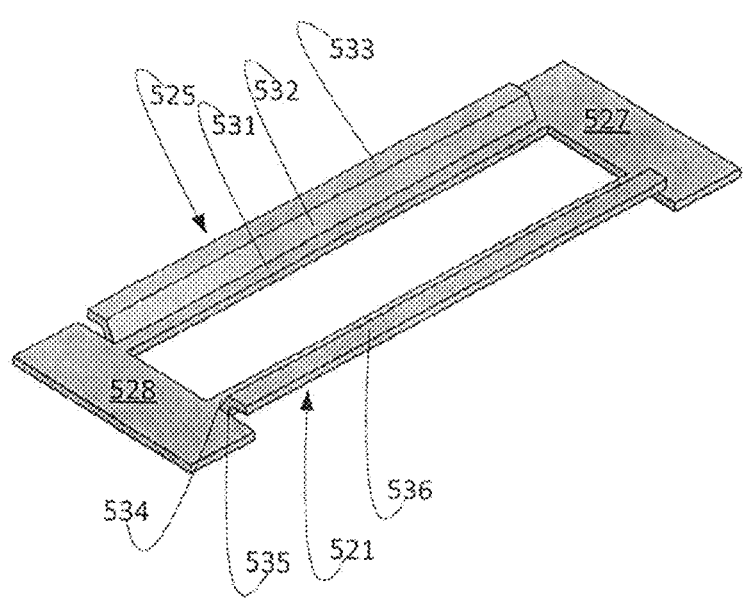
FIG. 5E illustrates a rail portion of assembly 520.

Referring now to FIG. 5E, first rail assembly 521 comprises a planar member 534 interconnecting planar member 527 and planar member 528. Planar member 535 is attached to, and extends outwardly from, planar member 534. Planar member 536 is attached to, and extends substantially horizontally outwardly from, planar member 535.

Second rail assembly 525 comprises a planar member 531 interconnecting planar member 527 and planar member 528. Planar member 532 is attached to, and extends outwardly from, planar member 531. Planar member 533 is attached to, and extends substantially horizontally outwardly from, planar member 532.

Figure 5F:
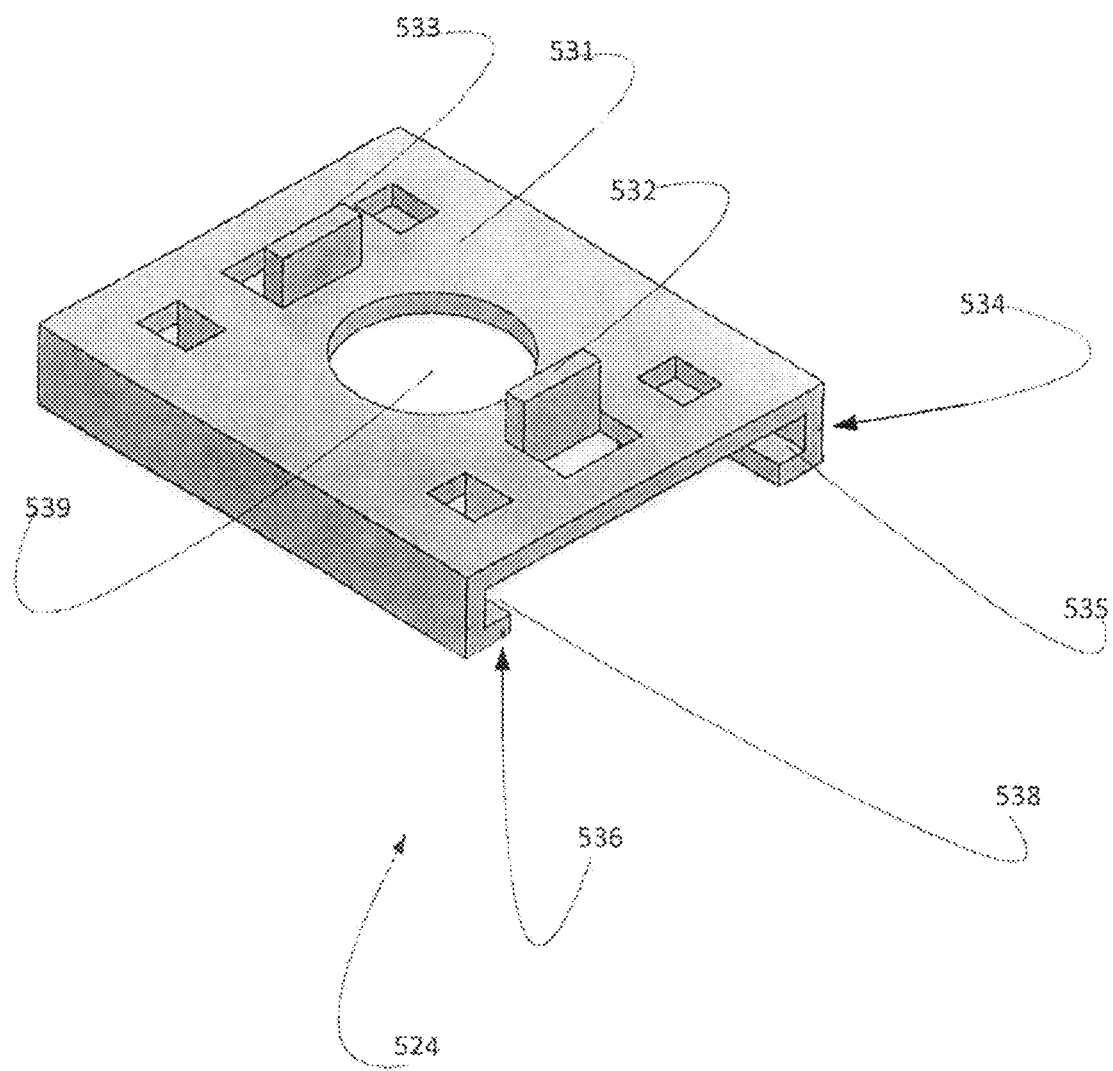
FIG. 5F illustrates a first embodiment of a sliceable portion of assembly 520.

In the illustrated embodiment of FIG. 5F, moveable assembly 524 is formed to include an aperture 539 extending therethrough. Moveable assembly 524 is further formed to include a planar member 532 attached to and extending outwardly from surface 531. Moveable assembly 524 is further formed to include a planar member 533 attached to and extending outwardly from surface 531. Hexagonal planar member 522 (FIG. 5D) is removably fixtured to surface 531 by planar members 532 and 533.

Moveable assembly 524 further comprises a first L-shaped assembly 534 attached to a first side of moveable assembly 524, wherein that first L-shaped assembly defines a slot 535 disposed beneath the entire first side of moveable assembly 524. Moveable assembly 524 further comprises a second L-shaped assembly 536 attached to a second and opposing side of moveable assembly 524, wherein that second L-shaped assembly defines a slot 538 disposed beneath the entire second side of moveable assembly 524.

In certain embodiments, first L-shaped member 534 is slidingly disposed around horizontal member 536 (FIG. 5E). In certain embodiments, second L-shaped member 536 is slidingly disposed around horizontal member 533 (FIG. 5E).

Figure 5G:
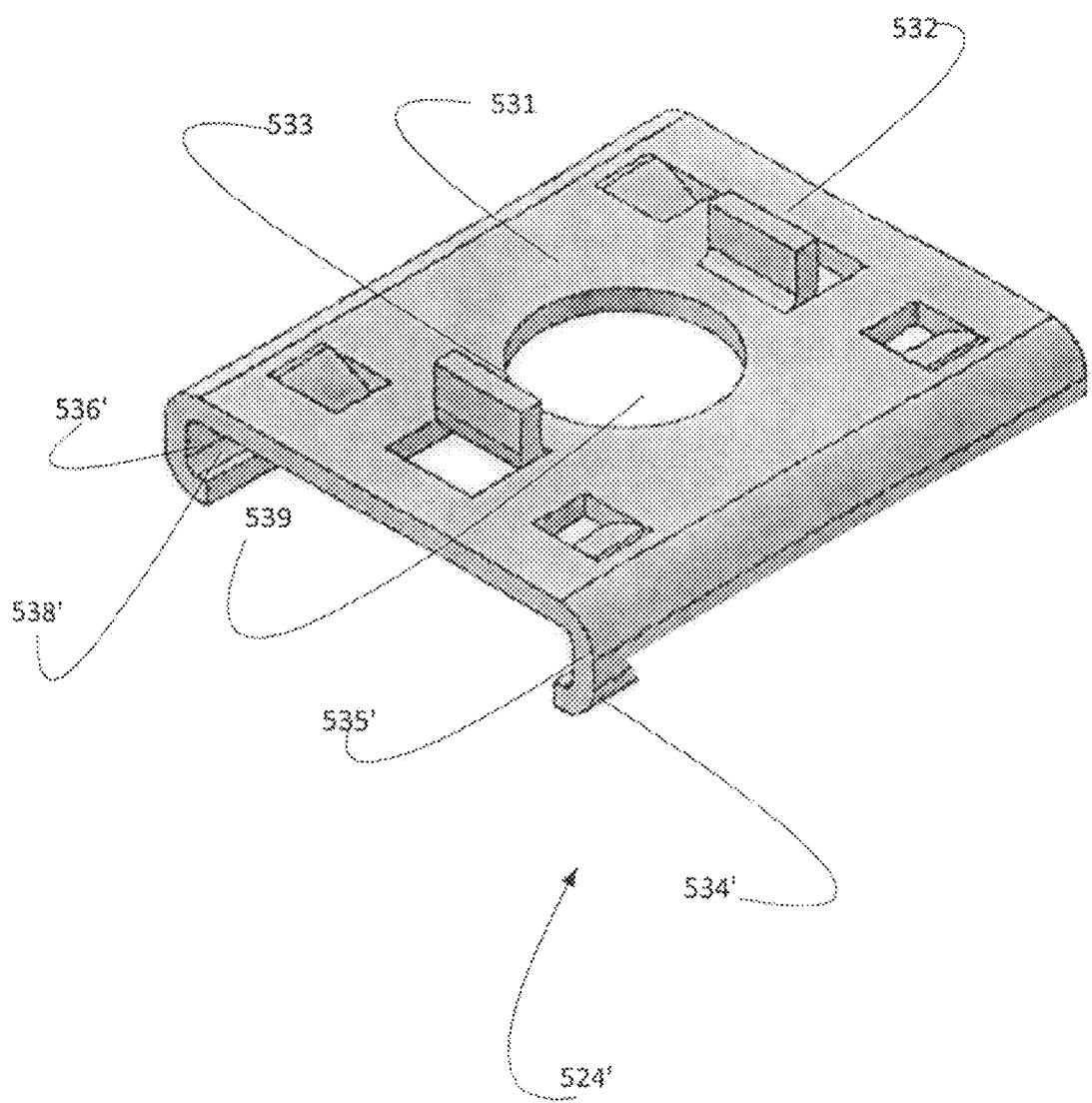
FIG. 5G illustrates a second embodiment of a sliceable portion of assembly 520.

In the illustrated embodiment of FIG. 5G, moveable assembly 524' comprises a first semi-circular member 534' attached to a first side of moveable assembly 524', to define a slot 535' disposed beneath the entire first side of moveable assembly 524'. Moveable assembly 524' further comprises a second semi-circular member 536' attached to a second side of moveable assembly 524', to define a slot 538' disposed beneath the entire second side of moveable assembly 524'.

Figures 5H, 5I:
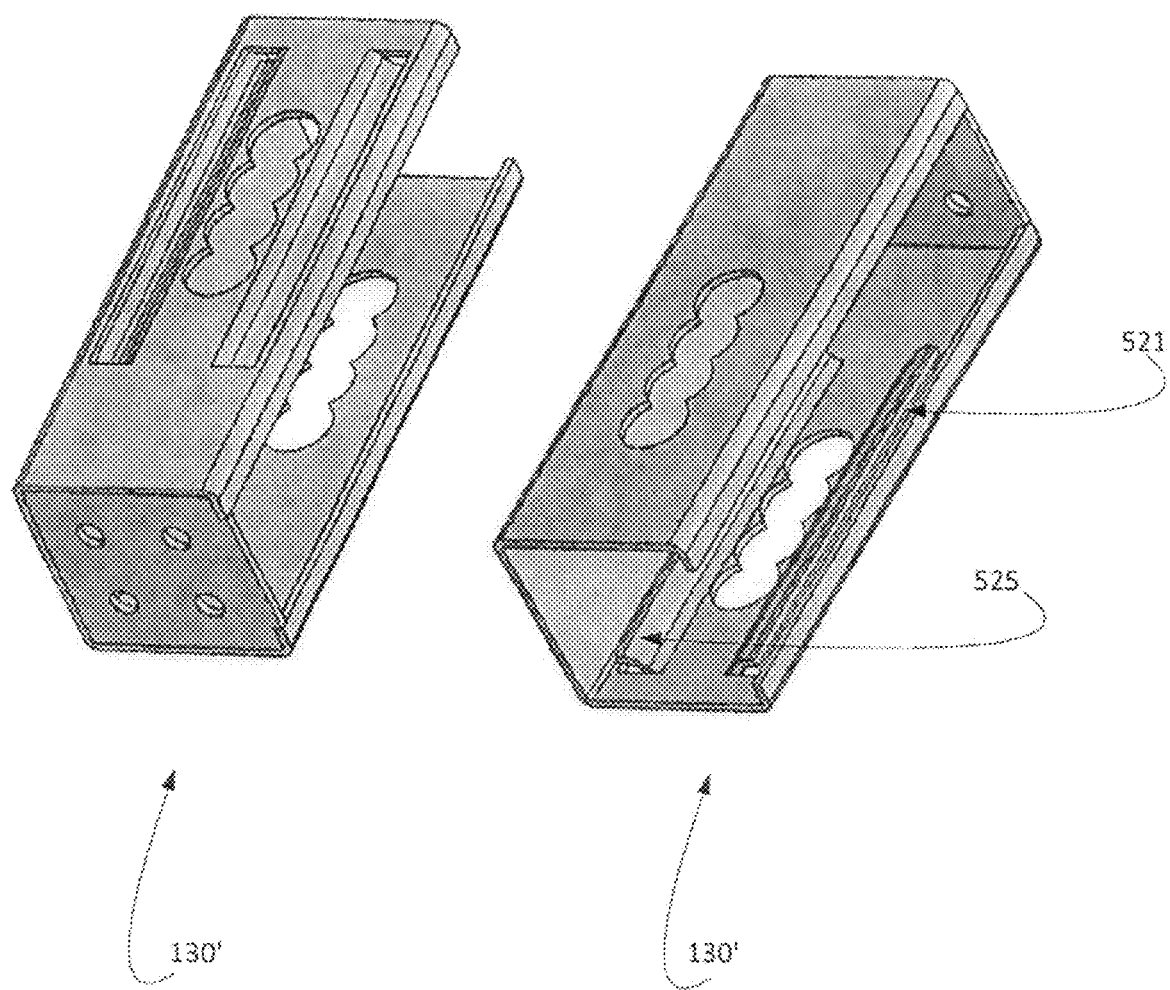
FIGS. 5H and 5I illustrate a second embodiment 130' of housing 130.

In the illustrated embodiment of FIGS. 5H and 5I, housing 130' includes the elements of housing 130 (FIGS. 5A, 5B) in combination with an integral first rail assembly 521 attached to an interior surface of a first side of housing 130', and in further combination with an integral second rail assembly 525 attached to the same interior surface of housing 130'.

Figure 5J:
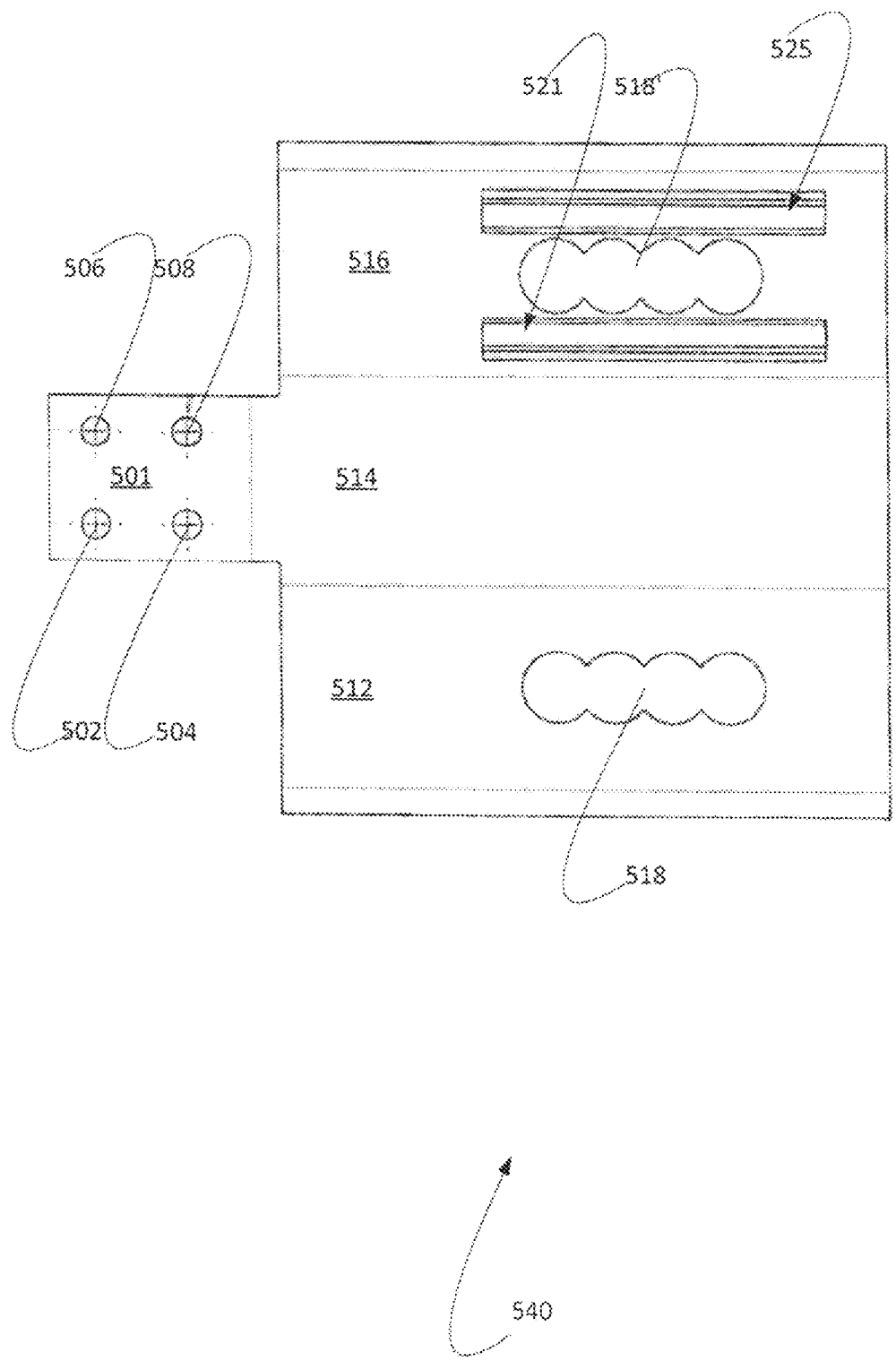
FIG. 5J illustrates a planar member that can be used to form a second embodiment of Applicant's housing.
Figure 5K:
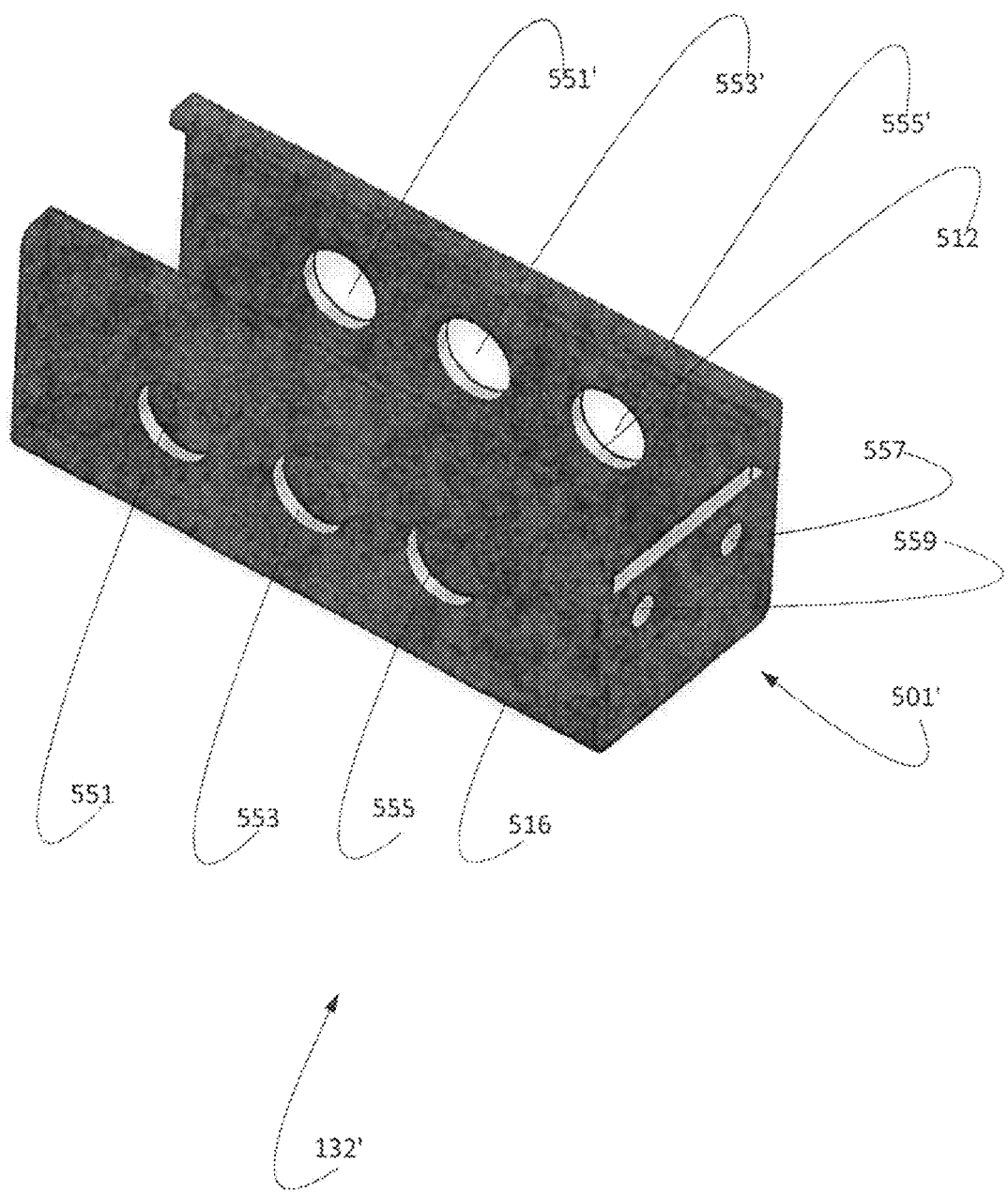
FIG. 5K illustrates a third embodiment 132' of Applicant's housing.

FIG. 5J illustrates a substantially planar assembly 540, which can be utilized to form housing 130' (FIGS. 5H, 5I). FIG. 5K illustrates housing 132', wherein housing 132' is formed to include a set of four (4) non-interconnected apertures extending through a first side 512 of housing 132', in combination with a corresponding set of four (4) non-interconnected apertures extending through a second side 516 of housing 132'.

Figure 5M:
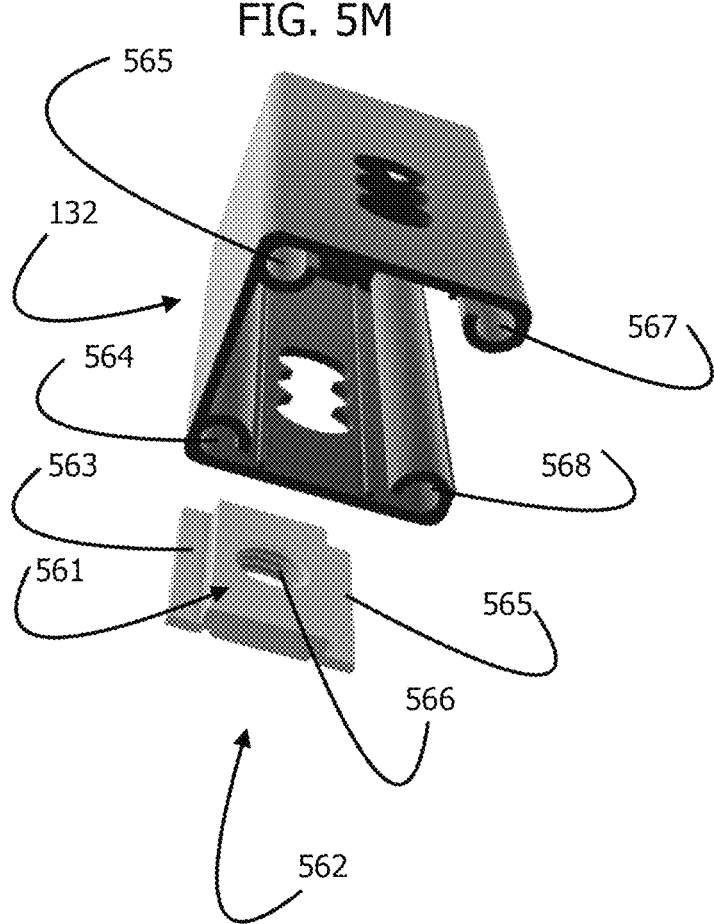

Referring now to FIGS. 5L and 5M, housing 132" is formed to include four (4) integral channels running the entire length thereof, namely channels 564, 565, 567, and 568. Moveable member 562 comprises a member 561 formed to include a threaded aperture 566 extending therethrough. Planar member 563 is attached to a first side of moveable member 561. Planar member 565 is attached to a second, and opposing side, of moveable member 561.

In the illustrated embodiment of FIG. 5L, planar member 563 is slidingly disposed within channel 564, and planar member 565 is slidingly disposed within channel 568. Moveable member 562 can be positioned such that threaded aperture 566 is aligned with one of a plurality of apertures extending through housing 132".

Figure 5N:
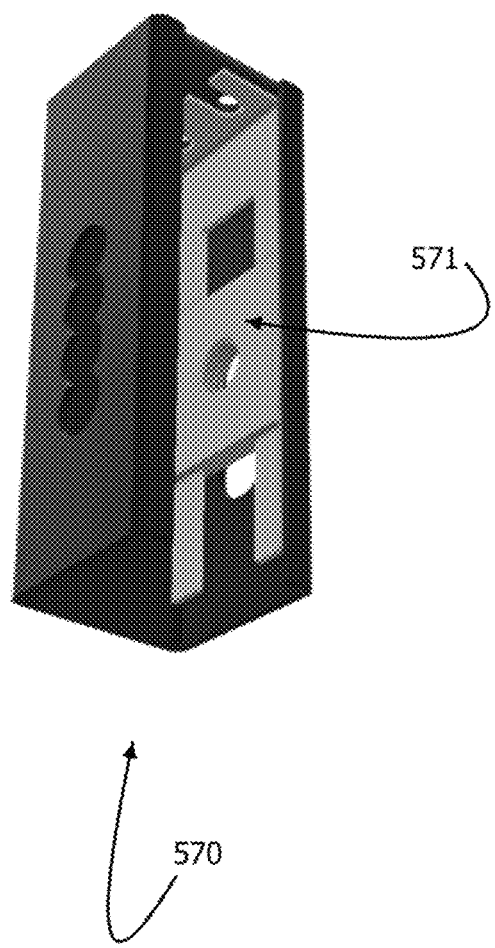
Figure 50:
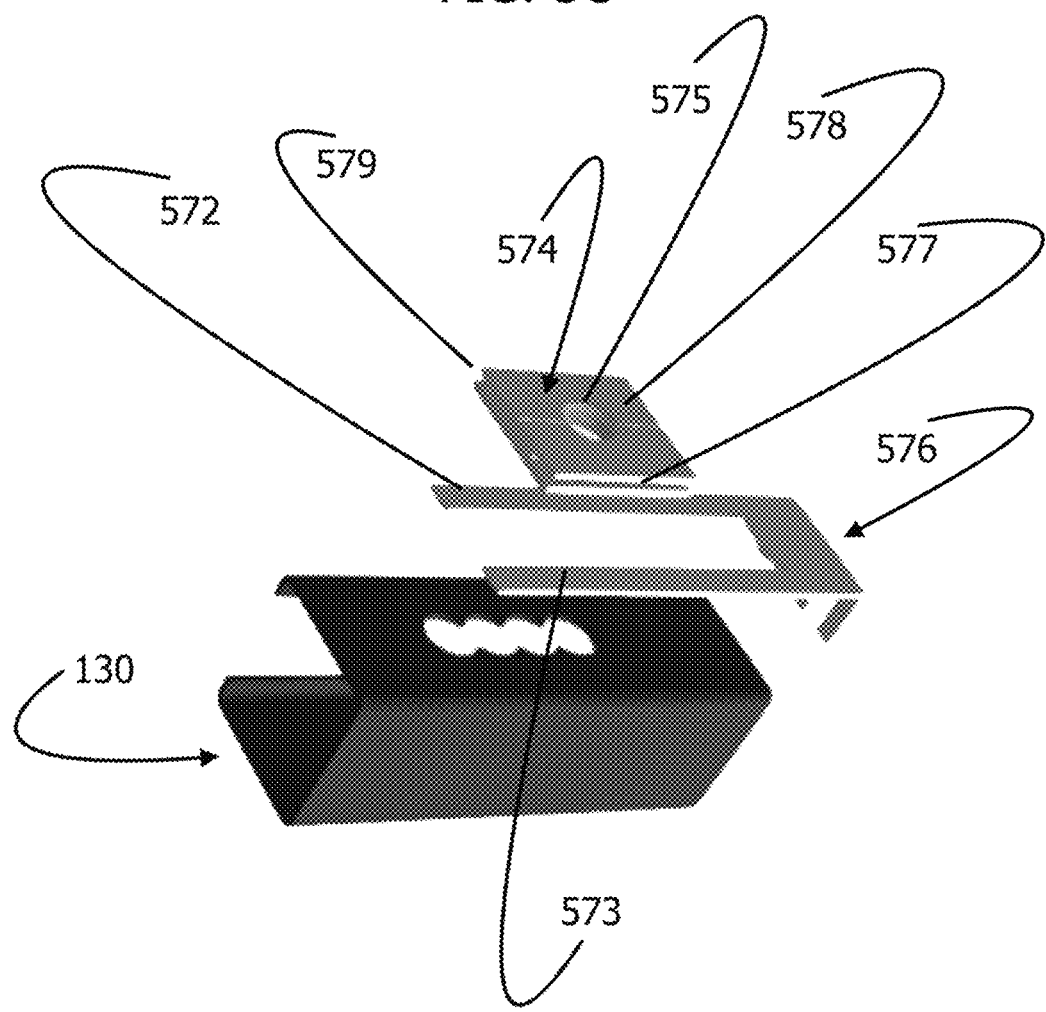

Referring now to FIGS. 5N and 5O, assembly 570 comprises housing 130 in combination with assembly 571. Assembly 571 comprises a moveable subassembly 574 and a rail system 576.

In the illustrated embodiment of FIG. 5O, moveable subassembly 574 comprises a planar member 578 formed to include a threaded aperture 575 extending therethrough. A first side of planar member 578 is formed to include a groove 577 running the length thereof. A second, and opposing, side of planar member 578 is formed to include a groove 579 running the length thereof. In the illustrated embodiment of FIG. 5N, moveable member 578 is slidingly attached to rail system 576 such that groove 579 accommodates rail 572, and such that groove 577 accommodates rail 573.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A trailer hitch cover assembly, comprising:
an inflatable object;
a first attachment plate disposed within the inflatable object;
a second attachment plate disposed in physical contact with, but external to, the inflatable object;
a housing comprising a receiver, and dimensioned to be received by a trailer hitch receiver; and
wherein a coupler is attached to said first attachment plate, extend outwardly from the first attachment plate through a surface of the inflatable object, extend through the second attachment plate, and intermesh with the receiver.

2. The assembly of claim 1, wherein the inflatable object is capable of withstanding at least 1000 pounds per square inch internal pressure.

3. The assembly of claim 1, wherein the inflatable object is capable of withstanding at least 1500 pounds per square inch internal pressure.

4. The assembly of claim 1, wherein the inflatable object is capable of withstanding at least 2000 pounds per square inch internal pressure.

5. The assembly of claim 1, wherein the receiver includes a plurality of threaded apertures and the coupler includes a corresponding plurality of threaded members.

6. The assembly of claim 1, wherein the first attachment plate is integrated structurally into the inflatable object.

7. The assembly of claim 1, further comprising at least one spring disposed between the second attachment plate and the housing.

8. The assembly of claim 1, wherein the inflatable object is a bladder with a thickness of approximately 10 mm.

9. The assembly of claim 1, wherein the inflatable object is comprised of a copolymer of acrylonitrile and butadiene.

10. The assembly of claim 1, wherein the inflatable object is comprised of at least one fluorocarbon elastomers.

11. The assembly of claim 1, wherein the inflatable object is comprised of at least one silicone elastomers.

12. The assembly of claim 1, further comprising:
an audible alert device;
a tubular member having a first open end disposed within said inflatable object, said tubular member extending through said inflatable object, through said first mounting plate, through said second mounting plate, and into said housing such a second a second open end is in fluid communication with said audible alert device.

13. The assembly of claim 12, wherein said tubular member further comprises a rupture disk comprising a rupture pressure disposed within said tubular member, wherein when the internal pressure within said inflatable object exceeds said rupture pressure, the rupture disk fails and pressurized air is driven through said audible alert device.

14. The assembly of claim 1, further comprising a pressure sensor capable of measuring the pressure within the inflatable object.

15. The assembly of claim 11, further comprising:
one or more light emitting devices;
a wiring harness interconnecting said one or more light emitting device to a vehicle electrical system;
a brake light power line monitor disposed within said housing;
wherein:
said wiring harness comprises a brake light power line;
when a voltage level in said brake light power line increases, then the brake light power line monitor causes said plurality of light emitting devices to emit visible light.

16. The assembly of claim 13, further comprising an air pump coupled to the pressure sensor for maintaining a threshold pressure within the inflatable object.

17. The assembly of claim 1, wherein the inflatable object is comprised of at least one of neoprene and polyacrylate.

* * * * *